(12) United States Patent
Skinner

(10) Patent No.: US 9,311,662 B2
(45) Date of Patent: *Apr. 12, 2016

(54) COMPUTER-IMPLEMENTED METHOD AND SYSTEM FOR MANAGING KEYWORD BIDDING PRICES

(71) Applicant: eBay Inc., San Jose, CA (US)

(72) Inventor: Darrin Skinner, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,251

(22) Filed: May 4, 2015

(65) Prior Publication Data

US 2015/0235278 A1    Aug. 20, 2015

Related U.S. Application Data

(63) Continuation of application No. 13/560,744, filed on Jul. 27, 2012, now Pat. No. 9,026,528, which is a continuation of application No. 12/830,193, filed on Jul. 2, 2010, now Pat. No. 8,234,276, which is a continuation of application No. 11/517,886, filed on Sep. 8, 2006, now Pat. No. 7,752,190.

(60) Provisional application No. 60/743,060, filed on Dec. 21, 2005.

(51) Int. Cl.
G06Q 30/02    (2012.01)

(52) U.S. Cl.
CPC ........ *G06Q 30/0275* (2013.01); *G06Q 30/0273* (2013.01)

(58) Field of Classification Search
None
See application file for complete search history.

(56) References Cited

U.S. PATENT DOCUMENTS

| | | | |
|---|---|---|---|
| 6,499,030 B1 | 12/2002 | Igata | |
| 6,704,727 B1 | 3/2004 | Kravets | |
| 6,826,572 B2 | 11/2004 | Colace et al. | |
| 6,876,997 B1 | 4/2005 | Rorex et al. | |
| 7,007,014 B2 | 2/2006 | Liu et al. | |
| 7,225,151 B1 | 5/2007 | Konia | |
| 7,225,182 B2 | 5/2007 | Paine et al. | |
| 7,752,190 B2 | 7/2010 | Skinner | |
| 7,792,858 B2 | 9/2010 | Tang et al. | |
| 8,036,937 B2 | 10/2011 | Tang et al. | |

(Continued)

OTHER PUBLICATIONS

U.S. Appl. No. 11/427,090, Final Office Action mailed Nov. 4, 2009, 17 pgs.

(Continued)

*Primary Examiner* — William Spieler
(74) *Attorney, Agent, or Firm* — Schwegman, Lundberg & Woessner, P.A.

(57) ABSTRACT

A computer-implemented method and system for managing keyword bidding prices are disclosed. An example method comprises: determining revenue parameters associated with a keyword; obtaining automatic bid controls associated with the keyword and the revenue parameters; automatically generating a bid value for the keyword based on the bid controls and the revenue parameters, the automatic bid controls including a gap position target value, the gap position target value representing a position in a gap between a first next higher bid and a second next higher bid, the gap position target value corresponding to a specific monetary value between the first next higher bid and the second next higher bid; and transmitting the bid value to an online service via a data network communication.

20 Claims, 16 Drawing Sheets

(56) References Cited

U.S. PATENT DOCUMENTS

| | | |
|---|---|---|
| 8,234,276 B2 | 7/2012 | Skinner |
| 8,655,912 B2 | 2/2014 | Tang et al. |
| 8,996,403 B2 | 3/2015 | Tang et al. |
| 9,026,528 B2 | 5/2015 | Skinner |
| 2002/0013763 A1 | 1/2002 | Harris |
| 2002/0038241 A1 | 3/2002 | Hiraga |
| 2002/0038282 A1 | 3/2002 | Montgomery |
| 2002/0072895 A1 | 6/2002 | Imanaka et al. |
| 2002/0111847 A1 | 8/2002 | Smith, II |
| 2002/0116313 A1 | 8/2002 | Detering |
| 2002/0128949 A1 | 9/2002 | Wiesehuegel et al. |
| 2002/0188694 A1 | 12/2002 | Yu |
| 2003/0055729 A1 | 3/2003 | Bezos et al. |
| 2003/0055816 A1 | 3/2003 | Paine et al. |
| 2003/0088525 A1 | 5/2003 | Velez et al. |
| 2003/0105677 A1 | 6/2003 | Skinner |
| 2003/0220918 A1 | 11/2003 | Roy et al. |
| 2004/0068460 A1 | 4/2004 | Feeley et al. |
| 2004/0088241 A1 | 5/2004 | Rebane et al. |
| 2004/0199496 A1 | 10/2004 | Liu et al. |
| 2004/0230574 A1 | 11/2004 | Kravets |
| 2004/0249709 A1 | 12/2004 | Donovan et al. |
| 2005/0065844 A1 | 3/2005 | Raj et al. |
| 2005/0071325 A1 | 3/2005 | Bem |
| 2005/0097024 A1 | 5/2005 | Rainey |
| 2005/0137939 A1 | 6/2005 | Calabria et al. |
| 2005/0144064 A1 | 6/2005 | Calabria et al. |
| 2005/0144065 A1 | 6/2005 | Calabria et al. |
| 2005/0189415 A1 | 9/2005 | Fano et al. |
| 2005/0223000 A1 | 10/2005 | Davis et al. |
| 2005/0228797 A1 | 10/2005 | Koningstein et al. |
| 2006/0004628 A1 | 1/2006 | Axe et al. |
| 2006/0041536 A1 | 2/2006 | Scholl et al. |
| 2006/0069614 A1 | 3/2006 | Agarwal et al. |
| 2006/0069784 A2 | 3/2006 | Hsu et al. |
| 2006/0149623 A1 | 7/2006 | Badros et al. |
| 2006/0173744 A1 | 8/2006 | Kandasamy et al. |
| 2006/0184500 A1 | 8/2006 | Najork et al. |
| 2006/0206516 A1 | 9/2006 | Mason |
| 2007/0027754 A1 | 2/2007 | Collins et al. |
| 2007/0027768 A1 | 2/2007 | Collins et al. |
| 2007/0027792 A1 | 2/2007 | Smith |
| 2007/0100811 A1 | 5/2007 | Error et al. |
| 2007/0130004 A1 | 6/2007 | Borgs et al. |
| 2007/0143266 A1 | 6/2007 | Tang et al. |
| 2007/0156757 A1 | 7/2007 | Tang et al. |
| 2007/0162379 A1 | 7/2007 | Skinner |
| 2010/0318568 A1 | 12/2010 | Tang et al. |
| 2011/0010263 A1 | 1/2011 | Skinner |
| 2012/0016906 A1 | 1/2012 | Tang et al. |
| 2012/0290386 A1 | 11/2012 | Skinner |
| 2014/0164383 A1 | 6/2014 | Tang et al. |
| 2015/0206184 A1 | 7/2015 | Tang et al. |

OTHER PUBLICATIONS

U.S. Appl. No. 11/427,090, Non-Final Office Action mailed Apr. 1, 2009, 17 pgs.

U.S. Appl. No. 11/427,090, Notice of Allowance mailed Apr. 30, 2010, 10 pgs.

U.S. Appl. No. 11/427,090, Response filed Mar. 4, 2010 to Final Office Action mailed Nov. 4, 2009, 12 pgs.

U.S. Appl. No. 11/427,090, Response filed Aug. 3, 2009 to Non Final Office Action mailed Apr. 1, 2009, 14 pgs.

U.S. Appl. No. 11/427,097, Final Office Action mailed Oct. 30, 2009, 23 pgs.

U.S. Appl. No. 11/427,097, Final Office Action mailed Nov. 28, 2008, 25 pgs.

U.S. Appl. No. 11/427,097, Non-Final Office Action mailed Apr. 1, 2010, 26 pgs.

U.S. Appl. No. 11/427,097, Non-Final Office Action mailed Apr. 18, 2008, 20 pgs.

U.S. Appl. No. 11/427,097, Non-Final Office Action mailed May 14, 2009, 23 pgs.

U.S. Appl. No. 11/427,097, Notice of Allowance mailed Feb. 24, 2011, 8 pgs.

U.S. Appl. No. 11/427,097, Notice of Allowance mailed Jun. 3, 2011, 9 pgs.

U.S. Appl. No. 11/427,097, Notice of Allowance mailed Nov. 15, 2010, 11 pgs.

U.S. Appl. No. 11/427,097, Response filed Mar. 1, 2010 to Final Office Action mailed Oct. 30, 2009, 18 pgs.

U.S. Appl. No. 11/427,097, Response filed Mar. 30, 2009 to Final Office Action mailed Nov. 28, 2008, 12 pgs.

U.S. Appl. No. 11/427,097, Response filed Aug. 14, 2009 to Non Final Office Action mailed May 14, 2009, 13 pgs.

U.S. Appl. No. 11/427,097, Response filed Aug 18, 2008 to Non-Final Office Action mailed Apr. 18, 2008, 18 pgs.

U.S. Appl. No. 11/427,097, Response filed Sep. 1, 2010 to Non Final Office Action mailed Apr. 1, 2010, 12 pgs.

U.S. Appl. No. 11/517,886, Final Office Action mailed Feb. 6, 2009, 12 pgs.

U.S. Appl. No. 11/517,886, Non-Final Office Action mailed Jun. 9, 2008, 16 pgs.

U.S. Appl. No. 11/517,886, Non-Final Office Action mailed Aug. 6, 2009, 12 pgs.

U.S. Appl. No. 11/517,886, Notice of Allowance mailed Feb. 22, 2010, 8 pgs.

U.S. Appl. No. 11/517,886, Response filed Oct. 9, 2008 to Non-Final Office Action mailed Jun. 9, 2008, 14 pgs.

U.S. Appl. No. 11/517,886, Response filed Jun. 8, 2009 to Final Office Action mailed Feb. 6, 2009, 13 pgs.

U.S. Appl. No. 11/517,886, Response filed Nov. 6, 2009 to Non Final Office Action mailed Aug. 6, 2009, 12 pgs.

U.S. Appl. No. 12/830,193, Final Office Action mailed Nov. 19, 2010, 12 pgs.

U.S. Appl. No. 12/830,193, Non Final Office Action mailed May 13, 2011, 9 pgs.

U.S. Appl. No. 12/830,193, Notice of Allowance mailed Jan. 30, 2012, 7 pgs.

U.S. Appl. No. 12/830,193, Notice of Allowance mailed Mar. 30, 2012, 5 pgs.

U.S. Appl. No. 12/830,193, Response filed Apr. 19, 2011 to Final Office Action mailed Nov. 19, 2010, 10 pgs.

U.S. Appl. No. 12/830,193, Response filed Sep. 13, 2011 to Non Final Office Action mailed May 13, 2011, 9 pgs.

U.S. Appl. No. 12/860,564, Final Office Action mailed Mar. 1, 2012, 14 pgs.

U.S. Appl. No. 12/860,564, Non Final Office Action mailed Sep. 14, 2011, 13 pgs.

U.S. Appl. No. 12/860,564, Notice of Allowance mailed Oct. 9, 2013, 17 pgs.

U.S. Appl. No. 12/860,564, Preliminary Amendment filed Sep. 14, 2010, 7 pgs.

U.S. Appl. No. 12/860,564, Response filed Jan. 17, 2012 to Non Final Office Action mailed Sep. 14, 2011, 10 pgs.

U.S. Appl. No. 12/860,564, Response filed Jul. 2, 2012 to Final Office Action mailed Mar. 1, 2012, 12 pgs.

U.S. Appl. No. 13/243,869, Examiner Interview Summary mailed Nov. 5, 2014, 3 pgs.

U.S. Appl. No. 13/243,869, Final Office Action mailed Nov. 20, 2013, 39 pgs.

U.S. Appl. No. 13/243,869, Non Final Office Action mailed Mar. 11, 2013, 66 pgs.

U.S. Appl. No. 13/243,869, Non Final Office Action mailed May 6, 2014, 42 pgs.

U.S. Appl. No. 13/243,869, Notice of Allowance mailed Nov. 19, 2014, 8 pgs.

U.S. Appl. No. 13/243,869, Preliminary Amendment filed Nov. 1, 2012, 8 pgs.

U.S. Appl. No. 13/243,869, Response filed Apr. 21, 2014 to Final Office Action mailed Nov. 20, 2013, 13 pgs.

U.S. Appl. No. 13/243,869, Response filed Sep. 10, 2013 to Non Final Office Action mailed Mar. 11, 2013, 19 pgs.

U.S. Appl. No. 13/243,869, Response filed Nov. 6, 2014 to Non Final Office Action mailed May 6, 2014, 15 pgs.

(56) References Cited

OTHER PUBLICATIONS

U.S. Appl. No. 13/560,744, Final Office Action mailed Jun. 26, 2014, 10 pgs.

U.S. Appl. No. 13/560,744, Final Office Action mailed Dec. 12, 2012, 12 pgs.

U.S. Appl. No. 13/560,744, Non Final Office Action mailed May 1, 2013, 10 pgs.

U.S. Appl. No. 13/560,744, Non Final Office Action mailed Nov. 26, 2013, 10 pgs.

U.S. Appl. No. 13/560,744, Notice of Allowance mailed Jan. 7, 2015, 10 pgs.

U.S. Appl. No. 13/560,744, Response filed Apr. 12, 2013 to Final Office Action mailed Dec. 12, 2012, 9 pgs.

U.S. Appl. No. 13/560,744, Response filed Apr. 28, 2014 to Non Final Office Action mailed Nov. 26, 2013, 9 pgs.

U.S. Appl. No. 13/560,744, Response filed Oct. 1, 2013 to Non Final Office Action mailed May 1, 2013, 10 pgs.

U.S. Appl. No. 14/181,052, Examiner Interview Summary mailed Aug. 21, 2015, 3 pgs.

U.S. Appl. No. 14/181,052, Non Final Office Action mailed Feb. 20, 2015, 27 pgs.

U.S. Appl. No. 14/181,052, Preliminary Amendment filed Jun. 19, 2014, 7 pgs.

U.S. Appl. No. 14/181,052, Response filed Aug. 20, 2015 to Non-Final Office Action mailed Feb. 20, 2015, 12 pgs.

U.S. Appl. No. 14/673,351, Pre-Interview First Office Action mailed Aug. 10, 2015, 4 pgs.

U.S. Appl. No. 14/673,351, Preliminary Amendment filed Jul. 23, 2015, 9 pgs.

U.S. Appl. No. 14/673,351, Response filed Sep. 10, 2015 to Pre-Interview First Office Action mailed Aug. 10, 2015, 2 pgs.

"Dear Inside Adwords . . .—deleting keywords, and those highlighted top ads", Google, (Aug. 17, 2005), 4 pgs.

"Urchin 5.000 Administration/User Guide, Chapters 1-5", Urchin Software Corporation, (Jul. 26, 2005), 1-114.

"Urchin 5.000 Administration/User Guide, Chapters 6-8", Urchin Software Corporation, (Jul. 26, 2005), 115-232.

"WebPosition 3 Gold", WebPosition, (2004), 4 pgs.

| KEYWORD | GLOBAL DIMENSIONS | | | | | | | SOURCE SPECIFIC | | | | | TRAFFIC | | CLUSTERING | |
|---|---|---|---|---|---|---|---|---|---|---|---|---|---|---|---|---|
| | YAHOO VOLUME | EBAY VOLUME | # EBAY SEARCH RESULTS | AFF KW? | INTERNATIONAL KW? | NATURAL KW? | ETC. | AFFILIATE ID | WHICH COUNTRY | COUNTRY REVENUE | COUNTRY COST | ETC. | TRAFFICKED | CPC | CATEGORY AFFINITY | VCRU BY KW |
| KEYWORD 1 | 100 | 50 | 200 | 1 | | 1 | | 123 | NA | NA | NA | NA | | | | |
| KEYWORD 2 | 3 | 0 | 3 | | | | | NA | NA | NA | NA | NA | | | | |
| ETC. | | | | | | | | | | | | | | | | |

Fig. 5

| KEYWORD | SCALED RPC | NEW BID | NEW NEXT BID | EXPECTED CPC |
|---|---|---|---|---|
| MAPLE WOOD | 0.247 | 0.26 | 0.26 | 0.22 |

| CURRENT POSITION | CPCHI | POS | CPCLOW |
|---|---|---|---|
| 3 | 0.27 | 2 | 0.21 |

| POS | MINIMUM DEVIATION |
|---|---|
| 4 | 0.027 |

| BID-2 | DEVIATION-2 | POSITION-2 |
|---|---|---|
| 0.28 | 0.043 | 1 |

| BID-1 | DEVIATION-1 | POSITION-1 | CEILING |
|---|---|---|---|
| 0.27 | 0.033 | 2 | 0.35 |

*Fig. 6*

| KEYWORD | SCALED RPC | CPC AVG | NEW CPC MAX | PREVIOUS DAY CPC MAX |
|---|---|---|---|---|
| LONGABERGER POTTERY | 0.66 | 0.14 | 0.77 | 0.77 |

| IMPRESSIONS | CLICKS | COST | AVG. POS |
|---|---|---|---|
| 67 | 5 | 0.68 | 1.1 |

| $ DEVIATION | % DEVIATION | CALC CPCMAX | CEILING |
|---|---|---|---|
| 0.52 | 78.70% | 1.38 | 0.86 |

*Fig. 7*

| HOME | GROUPS | AUTOBID | CREATIVES | LPS | CHANGE TRACKING | CONTROL PANELS | | SETTINGS | HELP? | ADMIN |
|---|---|---|---|---|---|---|---|---|---|---|

HOME > AUTOBID

AUTO BID CONTROL (ABC) MANAGER

| SECTION MENU |
|---|
| VIEW ALL ABCS |
| CREATE NEW ABC |

| NAME | PARTNER | ACTIVE | PARAMETERS | GROUPS | DELETE |
|---|---|---|---|---|---|
| GOOGLE EXPERIMENTAL | GOOGLE US | YES | 🗒 | 🗒 | X |
| GOOGLE MAIN | GOOGLE US | YES | 🗒 | 🗒 | X |
| MSN EXPERIMENTAL | MSN US | YES | 🗒 | 🗒 | X |
| MSN MAIN | MSN US | YES | | | |
| NEW YAHOO ABC US | YAHOO US | YES | 🗒 | 🗒 | X |
| YAHOO EXPERIMENTAL | YAHOO US | YES | | | X |
| YAHOO MAIN | YAHOO US | YES | | | X |

*Fig. 8*

| EDIT ABC PARAMETERS: GOOGLE | |
|---|---|
| DEFAULT MINIMUM CPC | 0.05 |
| | THE MINIMUM CPC WE CAN BID FOR ANY KEYWORD |
| DEFAULT MAXIMUM CPC | 2.00 |
| | THE MAXIMUM CPC WE CAN BID FOR ANY KEYWORD |
| RPC SCALING FACTOR | 0.20 |
| | THE AMOUNT TO ADJUST ALL RPCS BY USED TO PRODUCE THE SCALED RPC (SCALED RPC = RPC * RPC SCALING FACTOR) |
| BID CEILING FACTOR | 1.30 |
| | OUR BID AMOUNT SHOULD NEVER EXCEED BID CEILING FACTOR * SCALED RPC |
| BID INCREMENT FACTOR | 2.00 |
| | LIMIT ALL BID AMOUNT INCREASES TO NO MORE THAN THIS % CHANGE |
| BID INCREMENT VELOCITY FACTOR | 1.00 |
| | THE AMOUNT TO ADJUST THE FINAL BID BY DURING UPWARD MOVEMENTS OF THE BID. |
| BID DECREMENT FACTOR | 1.00 |
| | LIMIT ALL BID AMOUNT DECREASES TO NO MORE THAN THIS % CHANGE |
| BID DECREMENT VELOCITY FACTOR | 1.00 |
| | THE AMOUNT TO ADJUST THE FINAL BID BY DURING DOWNWARD MOVEMENTS OF THE BID. |
| MAX ACCEPTABLE AVERAGE POSITION | 1.50 |
| | THE GOAL FOR AVG POSITION. IF WE ARE SPENDING LESS THAN THE SCALED_RPC AND THE AVG POSITION IS GREATER THAN THIS ... UP OUR BID! |
| NO ACTIVITY DELAY PERIOD | 5.00 |
| | WHEN THERE IS NO ACTIVITY (NO CLICKS,NO IMPRESSIONS) DONT DO ANYTHING UNTIL THIS MANY DAYS HAVE PASSED. |
| NO CLICKS INCREMENT FACTOR | 0.15 |
| | WHEN THERE ARE NO CLICKS AT THE END OF THE NO ACTIVITY DELAY PERIOD THEN WE WANT TO INCREASE THE BID AMOUNT BY THIS FACTOR. |
| NO IMPRESSIONS INCREMENT FACTOR | 0.25 |
| | WHEN THERE ARE NO IMPRESSION AT THE END OF THE NO ACTIVITY DELAY PERIOD THEN WE WANT TO INCREASE THE BID AMOUNT BY THIS FACTOR. |
| INITIAL BID SCALING FACTOR | 1.10 |
| | THE FIRST BID FOR A NEW KEYWORD IS THE (TPC * TPC SCALING FACTOR * INITIAL BID SCALING FACTOR). NOTE: THE INITIAL BID MUST BE BELOW THE BID CEILING, OTHERWISE THE BID CEILING WILL BE USED INSTEAD. |
| DEFAULT RPC | 0.10 |
| | THE RPC VALUE TO USE WHEN NO OTHER RPC HAS BEEN DETERMINED FOR A KEYWORD. |
| | UPDATE PARAMS |

*Fig. 9*

| HOME | GROUPS | AUTOBID | CREATIVES | LPS | CHANGE TRACKING | CONTROL PANELS | | SETTINGS | HELP? | ADMIN |

HOME > AUTOBID > ABC INFO > EDIT PARAMETERS

EDIT ABC PARAMETERS: YAHOO

SECTION MENU

VIEW ALL ABCS
CREATE NEW ABC
ABC INFO
EDIT PARAMETERS
GROUPS
DELETE

DEFAULT MINIMUM CPC [0.11] THE MINIMUM CPC WE CAN BID FOR ANY KEYWORD

DEFAULT MAXIMUM CPC [2.00] THE MAXIMUM CPC WE CAN BID FOR ANY KEYWORD

RPC SCALING FACTOR [0.85] THE AMOUNT TO ADJUST ALL RPCS BY
USED TO PRODUCE THE SCALED RPC (SCALED RPC = RPC * RPC SCALING FACTOR)

DEVIATION SCALE UP FACTOR [1.00] FOR BIDS ABOVE OUR SCALED RPC, ADJUST THE BID BY THIS FACTOR

DEVIATION SCALE DOWN FACTOR [3.56] FOR BIDS BELOW OUR SCALED RPC, ADJUST THE BID BY THIS FACTOR

GAP POSITION TARGET [0.50] WHERE IN THE GAP DO WE WANT OUR NEW BID TO BE?

[UPDATE PARAMS]

*Fig. 10*

COMPUTER-IMPLEMENTED METHOD AND SYSTEM FOR MANAGING KEYWORD BIDDING PRICES

CROSS-REFERENCE TO RELATED PATENT APPLICATIONS

This patent application is related to U.S. patent application Ser. Nos. 11/427,090 and 11/427,097, filed on Jun. 28, 2006, and assigned to the same assignee as the present patent application.

This patent application is also related to U.S. patent application, Ser. No. 12/860,564, filed on Aug. 20, 2010, and assigned to the same assignee as the present patent application.

This patent application is also related to U.S. patent application, Ser. No. 13/243,869, filed on Sep. 23, 2011, and assigned to the same assignee as the present patent application.

This application is a continuation of U.S. application Ser. No. 13/560,744, filed Jul. 27, 2012, titled, "COMPUTER-IMPLEMENTED METHOD AND SYSTEM FOR MANAGING KEYWORD BIDDING PRICES," which is a continuation of U.S. application Ser. No. 12/830,193, filed Jul. 2, 2010, which application is a continuation of U.S. application Ser. No. 11/517,886, filed Sep. 8, 2006, now U.S. Pat. No. 7,752,190, which claims the benefit of the filing date of U.S. Provisional Patent Application Ser. No. 60/743,058, filed on Dec. 21, 2005, and titled, "A Computer-implemented Method and System for Combining Keywords into Logical Clusters that Share a Similar Behavior with Respect to a Considered Dimension", and assigned to the same assignee as the present patent application.

U.S. application Ser. No. 11/517,886, filed Sep. 8, 2006, now U.S. Pat. No. 7,752,190, also claims the benefit of the filing date of U.S. Provisional Patent Application Ser. No. 60/743,059, filed on Dec. 21, 2005, and titled, "A Computer-implemented Method and System for Enabling the Automated Selection of Keywords for Rapid Keyword Portfolio Expansion", and assigned to the same assignee as the present patent application.

U.S. application Ser. No. 11/517,886, filed Sep. 8, 2006, now U.S. Pat. No. 7,752,190, also claims the benefit of the filing date of U.S. Provisional Patent Application Ser. No. 60/743,060, filed on Dec. 21, 2005, and titled, "A Computer-implemented Method and System for Managing Keyword Bidding Prices", and assigned to the same assignee as the present patent application.

BACKGROUND

1. Technical Field

This disclosure relates to methods and systems supporting keyword advertising associated with Internet search engine usage and keyword query submittal by a user. More particularly, the present disclosure relates to automated bidding for search keywords.

2. Related Art

An increasingly popular way of delivering Internet advertisements is to tie the advertisement to search query results triggered by the entry of particular keywords (e.g. search queries) by a user. In order to target advertising accurately, advertisers or vendors pay to have their advertisements presented in response to certain kinds of queries—that is, their advertisements are presented when particular keyword combinations are supplied by the user of the search engine.

For example, when a user searches for "baseball cards," using a search engine such as Google or other well-known search engines, in addition to the usual query results, the user will also be shown a number of sponsored results. These will be paid advertisements for businesses, generally offering related goods and/or services. In this example, the advertisements may therefore be directed to such things as baseball card vendors, collectibles shops, sports memorabilia, or even sporting goods or event tickets. Of course, the advertisements may be directed to seemingly less related subject matter. While the presentation varies somewhat between search engines, these sponsored results are usually shown a few lines above, or on the right hand margin of the regular results. Although, the sponsored results may also be placed anywhere in conjunction with the regular results.

Keyword advertising is growing as other types of web advertising are generally declining. It is believed there are at least several features that contribute to its success. First, sponsored results are piggybacked on regular results, so they are delivered in connection with a valuable, seemingly objective, service to the user. By contrast, search engines that are built primarily on sponsored results have not been as popular. Second, the precision of the targeting of the advertising means the user is more likely to find the advertisements useful, and consequently will perceive the advertisements as more of a part of the service than as an unwanted intrusion. Unlike banners and pop-up advertisements, which are routinely ignored or dismissed, users appear more likely to click through these sponsored results (e.g., keyword advertisements). Third, the targeting is based entirely on the current query, and not on demographic data developed over longer periods of time. This kind of targeting is timelier and more palatable to users with privacy concerns. Fourth, these advertisements reach users when they are searching, and therefore when they are more open to visiting new web sites.

Companies, such as Google of Mountain View, Calif., which offers a search engine and Overture of Pasadena, Calif. (now Yahoo Search), which aggregates advertising for search engines as well as offering its own search engine, use an auction mechanism combined with a pay-per-click (PPC) pricing strategy to sell advertising. This model is appealing in its simplicity. Advertisers bid in auctions for placement of their advertisements in connection with particular keywords or keyword combinations. The amount they bid (e.g., cost-per-click (CPC)) is the amount that they are willing to pay for a click-through on their link. For example, in one Yahoo/Overture PPC pricing strategy, if company A bids $1.10 for the keyword combination "baseball cards", then its advertisement will be placed above a company bidding $0.95 for the same keyword combination. Only a selected number of bidders' advertisements will be shown. The simplicity of the model makes it easy for an advertiser to understand why an advertisement is shown, and what bid is necessary to have an advertisement shown. It also means that advertisers are charged only for positive click-through responses.

Both Google and Overture offer tools to help users identify additional keywords based on an initial set of keywords. The Overture model supplies keywords that actually contain the keyword (e.g. for bicycle one can get road bicycle, Colonago bicycle, etc.). Google, on the other hand, performs some kind of topic selection, which they claim is based on billions of searches.

Both Google and Overture offer tools to help users manage their bids. Google uses click-through rate and PPC to estimate an expected rate of return which is then used to dynamically rank the advertisements. Overture uses the PPC pricing strategy to rank advertisements, but monitors the click-through rate for significantly under performing advertisements.

Because Google dynamically ranks the advertisements based on click-through and PPC, advertisers cannot control their exact advertisement position with a fixed PPC. To insure a top position, the advertiser must be willing to pay a different price that is determined by their own click through rate as well as the competitors click-though rates and PPC. Overture uses a fixed price model, which insures fixed position for fixed price.

If a set of keywords that have not been selected by any of the advertisers is issued as a search term, Google will attempt to find the best matching selected set of keywords and display its associated advertisements. For example, let's say a user searches on "engagement ring diamond solitaire." However, there are no advertisers bidding on this search term. The expanded matching feature will then match (based on term, title, and description) selected listings from advertisers that have bid on search terms (e.g. keyword combinations) like "solitaire engagement ring" and "solitaire diamond ring."

A number of third parties provide services to Overture customers to identify and select keywords and track and rank bids. For example, BidRank, Dynamic Keyword Bid Maximizer, Epic Sky, GoToast, PPC BidTracker, PPC Pro, Send Traffic, Sure Hits, and Efficient Frontiers. There are a small number of pay-per-bid systems. For example, Kanoodle is a traditional pay-per-bid system like Overture. Other examples, include Sprinks and FindWhat.

The Sprinks brand system, ContentSprinks™, produces listings that rely on context, as opposed to one-to-one matching with a keyword. The user chooses topics, rather than keywords. The Sprinks web site asserts, "Since context is more important than an exact match, you can put your offer for golf balls in front of customers who are researching and buying golf clubs, and your listing will still be approved, even though it's not an exact match." This is a pay-per-bid model, like Overture, and has been used by About.com, iVillage.com and Forbes.com. The Sprinks brand system, KeywordSprinks™, is a traditional pay-per-bid model for keywords and phrases.

FindWhat has a BidOptimizer™ that shows the bids of the top five positions so that a user can set their bid price for a keyword to be at a specific position. BidOptimizer™ enables the user to set a maximum bid (max bid) on a keyword and choose the position (first, second, third, fourth, or fifth) the keyword is listed on the network, as long as obtaining the chosen position does not exceed the max bid the user has set. If the position the user chooses requires a higher max bid than the amount the user has set, BidOptimizer ranks the user's keyword in the next best position possible.

In addition, there is a system called Wordtracker for helping users to select keywords. The Wordtracker system at <www.wordtracker.com> provides a set of tools to help users to identify keywords for better placement of advertisements and web pages in search engines, both regular and pay-per-bid. Wordtracker provides related words with occurrence information, misspelled word suggestions based on the number of occurrences of the misspelled words, and tools for keeping track of possible keyword/key phrase candidates. The related words are more than variants. On the web site, an example of related keywords for "golf" includes pga, Ipga, golf courses, tiger woods, golf clubs, sports, jack nicklaus, and titleist, as well as phrases that include the term "golf," such as golf clubs, golf courses, golf equipment, used golf clubs, golf tips, golf games, and vw.golf. Wordtracker displays the bid prices for a keyword on selected pay-per-bid search engines. It also displays the number of occurrences of search terms by search engine so the keywords can be tuned to each search engine.

Wordtracker can be a useful tool, but it does not automate certain aspects of the advertiser's decision-making, bidding, and placement of advertisements. Currently, an advertiser must participate in every auction of relevant keywords. In the example above, a company offering sporting goods may want its advertisements to be placed with a variety of keywords corresponding to common queries related to sports equipment, training, events, etc. These keywords vary in their relevance to the company's business, in their "yield" of productive click-through visits to the company's web site, and their cost to the company (based on competition in the auctions). The multiplicity of keyword combinations and the multiplicity of considerations for each keyword combination create a number of opportunities for automation support mechanisms for advertisement placement decision making.

In the process of bidding in keyword auctions, advertisers may compete in ways that are mutually detrimental. There may be better joint strategies that are less costly, or involve alternative keywords, but the individual bidders do not easily discover these joint strategies. Even when the individual bidders know good joint strategies, the individual bidders may not have a strong incentive to pursue these strategies without some assurance of cooperation.

If the process of selecting and bidding for keyword combinations for an advertiser was automated or more automated, it likely that less guidance would be required from the advertiser and that advertisements would be placed on more effective keywords. It is also likely that such automation would help maximize return on advertising investment (ROAI), increase the number sponsored keywords, and maximize click-through rates for keyword advertisements.

Several published U.S. patent applications disclose concepts related to bidding for a position of a keyword advertisement in a search results list. For example, U.S. Patent Application Pub. No. U.S. 2005/0144064 A1 discloses a method of generating a bid for an advertiser for placement of an advertisement in association with a search results list, where the search results list is generated in response to a search query. In one embodiment, the method includes: a) associating the at least one keyword with the bid, wherein the search query is associated with the at least one keyword, and b) determining an amount of the bid, associated with the at least one keyword, for placement of the advertisement in association with the search results list generated in response to the search query associated with the at least one keyword. The bid is determined based at least in part on bids by other advertisers in competition with the first advertiser for placement of other advertisements with an expectation that the determined bid may elicit a desired change in the bids by the other advertisers.

U.S. Patent Application Pub. No. U.S. 2005/0144065 A1 discloses a method of coordinating one or more bids for one or more groups of advertisers for placement of at least one advertisement in association with a search results list. The search results list is generated in response to a search query. The method includes: a) collecting information from at least two advertisers in the advertiser group and b) devising a joint strategy for the advertiser group for bidding in the keyword auction. In another embodiment, a method of generating a bid for a first advertiser for placement of a first advertisement in association with a search results list is provided. In another embodiment, an apparatus for generating the bid for the first advertiser is provided. Is still another embodiment, a method of coordinating bids from a first advertiser and a second advertiser for placement of at least one advertisement in association with a first search results list is provided.

U.S. Patent Application Pub. No. U.S. 2005/0071325 A1 discloses a system wherein the number of ads potentially relevant to search query information may be increased by relaxing the notion of search query keyword matching. This may be done, for example, by expanding a set of ad request keywords to include both query keywords (or derivatives of a root thereof) and related keywords. The related keywords may be words with a relatively high co-occurrence with a query keyword in a group of previous search queries (e.g., search queries in a session). The scores of ads with keyword targeting criteria that matched words related to words in a search query, but not the words from the search query, may be discounted. That is, the scores of ads served pursuant to a relaxed notion of matching may be discounted relative to the scores of ads served pursuant to a stricter notion of matching. This may be done by using a score modification parameter, such as an ad performance multiplier (for cases in which an ad score is a function of ad performance information). The score modification parameter may be updated to reflect observed performance data, such as performance data associated with {word-to-related word} mappings.

U.S. Patent Application Pub. No. U.S. 2005/0137939 A1 discloses a server-based method of automatically generating a plurality of bids for an advertiser for placement of at least one advertisement in association with a search results list. The method includes: a) receiving at least one candidate advertisement, b) creating a list of candidate keywords, c) estimating a click-through rate for each advertisement-keyword pair, d) calculating a return on advertising investment (ROAI) for each advertisement-keyword pair, and e) calculating a bid amount for each advertisement-keyword pair. In another aspect, a server-based method of generating a bid for placement of an advertisement in association with a search results list is provided. In other aspects, a method of selecting one or more keywords in conjunction with the bid is provided as well as a method of determining a return on advertising investment (ROAI) information for an advertiser in conjunction with the bid is provided.

U.S. Patent Application Pub. No. U.S. 2004/0088241 A1 discloses a "Keyword Automated Bidding System" (KABS) which, among other things, provides an intelligent system for bidders for a ranking in web search results list to determine bids and bidding strategies that maximize return on bid investments and help direct allocation of available funds for bids to keywords that lead to more optimal returns. An example embodiment is designed to generate a scalable solution to the problem of selecting the proper set of keywords to bid and the proper values of such bids for thousands of keywords on third party sites such as Overture and Google.com. The scalable solution is generated according to operator-defined model constraints and utility functions. In one embodiment, KABS maximizes profit by maximizing the Margin Rate to a bidder which is the difference in the aggregate Revenue per Redirect (RPR) from the merchants and the Cost per Click (CPC) that must be paid to the traffic source. The prime constraint on this solution is the total CPC dollar amount that is budgeted over a fixed interval of time (day, week, etc.). A major computational subsystem of KABS performs the estimation of arrival or click-thru rates for each keyword or category of keywords as a function of their display ranks on the source site. It is the form and level of this estimated function that is critical in the selection of the proper display rank from an active bid table a spider retrieves for each keyword. The KABS operator will be required to provide the inputs that direct and constrain the system's operation. Among these is the comprehensive set of keywords of interest from which the proper subset will be computed. Other key inputs include the frequencies of executing the various KABS from re-computing the arrival functions to regeneration of the bid set of keywords along with their corresponding bids and display ranks.

U.S. Patent Application Pub. No. U.S. 2004/0068460 A1 discloses a method and system enabling advertisers to achieve a desired ordinal position of a web page link in a list of search results generated by a bid-for-position search engine on the Internet in response to a keyword search. The method involves surveying other bid-for-position search engines to collect available bid data, determining a network high bid amount for a keyword of interest and the desired position, and adjusting the advertiser's bid on the keyword to be at least as much as the network high bid amount for that keyword and desired position.

U.S. Patent Application Pub. No. U.S. 2003/0088525 A1 discloses a method and apparatus (information processing system) for overcoming deficiencies and inefficiencies in the current paid search engine keyword bidding market, by providing keyword bidders with information they need to better optimize their use of paid search engines. The system accumulates bid amounts for a plurality of target keywords at one or more paid Internet search engines, and presents the bid amounts to a user, enabling the user to evaluate and optimize bids on those keywords. The system also presents bid amounts for a keyword at one or more paid Internet search engines, in a manner highlighting one or more selected bid amounts of interest to a potential bidder. This permits a bidder to identify the bidder's own bid, and/or to identify a differential in bid amounts that indicates an opportunity for bid optimization. The system further monitors keyword bids at one or more paid Internet search engines to identify bid changes of interest to a potential bidder.

U.S. Patent Application Pub. No. U.S. 2003/0055729 A1 discloses a method and system for allocating display space on a web page. In one embodiment, the display space system receives multiple bids each indicating a bid amount and an advertisement. When a request is received to provide a web page that includes the display space, the display space system selects a bid based in part on the bid amount. The display space system then adds the advertisement of the selected bid to the web page. The bid may also include various criteria that specify the web pages on which the advertisement may be placed, the users to whom the advertisement may be presented, and the time when the advertisement may be placed. The bid amount may be a based on an established currency or based on advertising points. The display space system may award advertising points for various activities that users perform. The activities for which advertising points may be awarded may include the listing of an item to be auctioned, the bidding on an item being auctioned, the purchasing of an item at an auction, or the purchasing of an item at a fixed price. The display space system tracks the advertising points that have been allocated to each user. When an advertisement is placed on a web page on behalf of the user, the display space system reduces the number of advertising points allocated to that user. The display space system may also provide an auto bidding mechanism that places bids for display space on behalf of the user.

U.S. Patent Application Pub. No. U.S. 2003/0055816 A1 discloses a pay-for-placement search system that makes search term recommendations to advertisers managing their accounts in one or more of two ways. A first technique involves looking for good search terms directly on an advertiser's web site. A second technique involves comparing an advertiser to other, similar advertisers and recommending the search terms the other advertisers have chosen. The first technique is called spidering and the second technique is called collaborative filtering. In the preferred embodiment, the output of the spidering step is used as input to the collaborative filtering step. The final output of search terms from both steps is then interleaved in a natural way.

U.S. Patent Application Pub. No. U.S. 2003/0105677 A1 discloses an automated web ranking system which enables advertisers to dynamically adjust pay-per-click bids to control advertising costs. The system tracks search terms which are used to market an advertiser's product or services in on-line marketing media ("OMM"). The system determines the search term's effectiveness by collecting and analyzing data relating to the number of impressions, the number of clicks, and the number of resulting sales generated by a search term at a given time period. Based on the data collected and parameters which the advertiser provides relating to the advertiser's economic factors, the system calculates a maximum acceptable bid for each search term. The system monitors the web for competitor's bids on an advertiser's search term and places bids which fall below the maximum acceptable bid.

United States Patent Application No. 2005/0223000 discloses a system and method for enabling information providers using a computer network to influence a position for a search listing within a search result list. A database stores accounts for the network information providers. Each account contains contact and billing information. In addition, each account contains at least one search listing having at least three components: a description, a search term comprising one or more keywords, and a bid amount. The network information provider may add, delete, or modify a search listing after logging into his or her account via an authentication process. The network information provider influences a position for a search listing in the provider's account by first selecting a relevant search term and entering that search term and the description into a search listing. A continuous online competitive bidding process occurs when the network information provider enters a new bid amount for a search listing. This bid amount is compared with all other bid amounts for the same search term. A rank value is generated for all search listings having that search term. The generated rank value determines where the network information provider's listing will appear on the search results list page that is generated in response to a query of the search term by a searcher at a client computer on the computer network. A higher bid by a network information provider will result in a higher rank value and a more advantageous placement.

United States Patent Application No. 2005/0065844 discloses a system and method for automating the management of an advertising campaign for a sponsored search application. An advertiser can easily manage their advertising campaign based on a budget and other information that they are most familiar with, e.g., the length of time for the campaign, desired number of total clicks during the campaign, the time zone of the campaign, keywords to be bid upon for the sponsored search application, the advertisement (copy and heading), and the URL associated with the location of the advertisement copy. With this relatively basic information provided, an example embodiment can automatically manage the bidding on both small and relatively large numbers of keywords for an advertising campaign.

United States Patent Application No. 2004/0230574 discloses a method and system for providing a set of search terms in response to a user input. A first set of search terms is selected from a master set of search terms based upon a match between the input and the search terms or based upon a predefined association between the input and the search terms. A second set of search terms is selected from the first set of search terms in response to a value score that is established for each of the search terms. The value score is selected based at least in part upon the amount of revenue that each search term generates for the system's operator.

United States Patent Application No. 2004/0199496 discloses a presentation system accepts presentations or references to presentations from prospective presenters. Some or all of the presentations or references are stored in a database and referenced by keywords such that presentations to be presented in response to particular searches can be identified. A presentation manager handles accepting bids and settling terms between prospective presenters. The results of such processes might be stored in a presentation details database. A presentation server handles retrieving presentations from the presentation details database for presentation to users along with requests such as search results. Both the presentation manager and the presentation server can operate on a keywords-basis, wherein presentation terms specify keywords to be associated with particular presentations and the presentation server serves particular presentations based on keywords in a search query for which the presentations are to be returned. The association of keywords can be done using canonicalization so that, under certain conditions, different keywords are treated as the same keyword. Canonicalizations might include plural/singular forms, gender forms, stem word forms, suffix forms, prefix forms, typographical error forms, word order, pattern ignoring, acronyms, stop word elimination, etc. Conditions might include aspects of the search query state, such as the user's demographics, the page from which the search query was initiated, etc.

U.S. Pat. No. 6,826,572 describes a system for advertisers to efficiently manage their search listings in placement database search system includes grouping means for managing multiple categories for the search listings and query means for searching search listings. The system further includes quick-fill means for modifying an attribute in a plurality of search listings by specifying the modification at a single location. The system provides a method and system for a pay for placement database search system. The method and system include grouping and querying, one or more search listings associated with an advertiser, and providing the advertisers an ability to simultaneously modify a plurality of search listings. The advertisers also possess means to search the categories and gather statistical data for an entire category.

U.S. Pat. No. 6,704,727 describes a method and system for providing a set of search terms in response to a user input. A first set of search terms is selected from a master set of search terms based upon a match between the input and the search terms or based upon a predefined association between the input and the search terms. A second set of search terms is selected from the first set of search terms in response to a value score that is established for each of the search terms. The value score is selected based at least in part upon the amount of revenue that each search term generates for the system's operator.

U.S. Pat. No. 6,876,997 discloses a method of generating a search result list and also provides related searches for use by a searcher. Search listings which generate a match with a search request submitted by the searcher are identified in a pay for placement database which includes a plurality of search listings. Related search listings contained in a related search database generated from the pay for placement database are identified as relevant to the search request. A search result list is returned to the searcher including the identified search listings and one or more of the identified search listings.

Thus, a computer-implemented method and system for managing keyword bidding prices are needed.

BRIEF DESCRIPTION OF THE DRAWINGS

Embodiments illustrated by way of example and not limitation in the figures of the accompanying drawings, in which:

FIG. 5 illustrates an example of the metrics processed by the keyword aggregator of one embodiment.

FIG. 6 illustrates an example of the parameters generated as a result of the process described below for a sample Yahoo/Overture bidding strategy.

FIG. 7 illustrates an example of the parameters generated as a result of the process described below for a sample Google bidding strategy.

FIGS. 8-12 are sample screen snapshots of a user interface for an example embodiment for controlling parameters used in the automatic bid control system.

DETAILED DESCRIPTION

Figure 1:
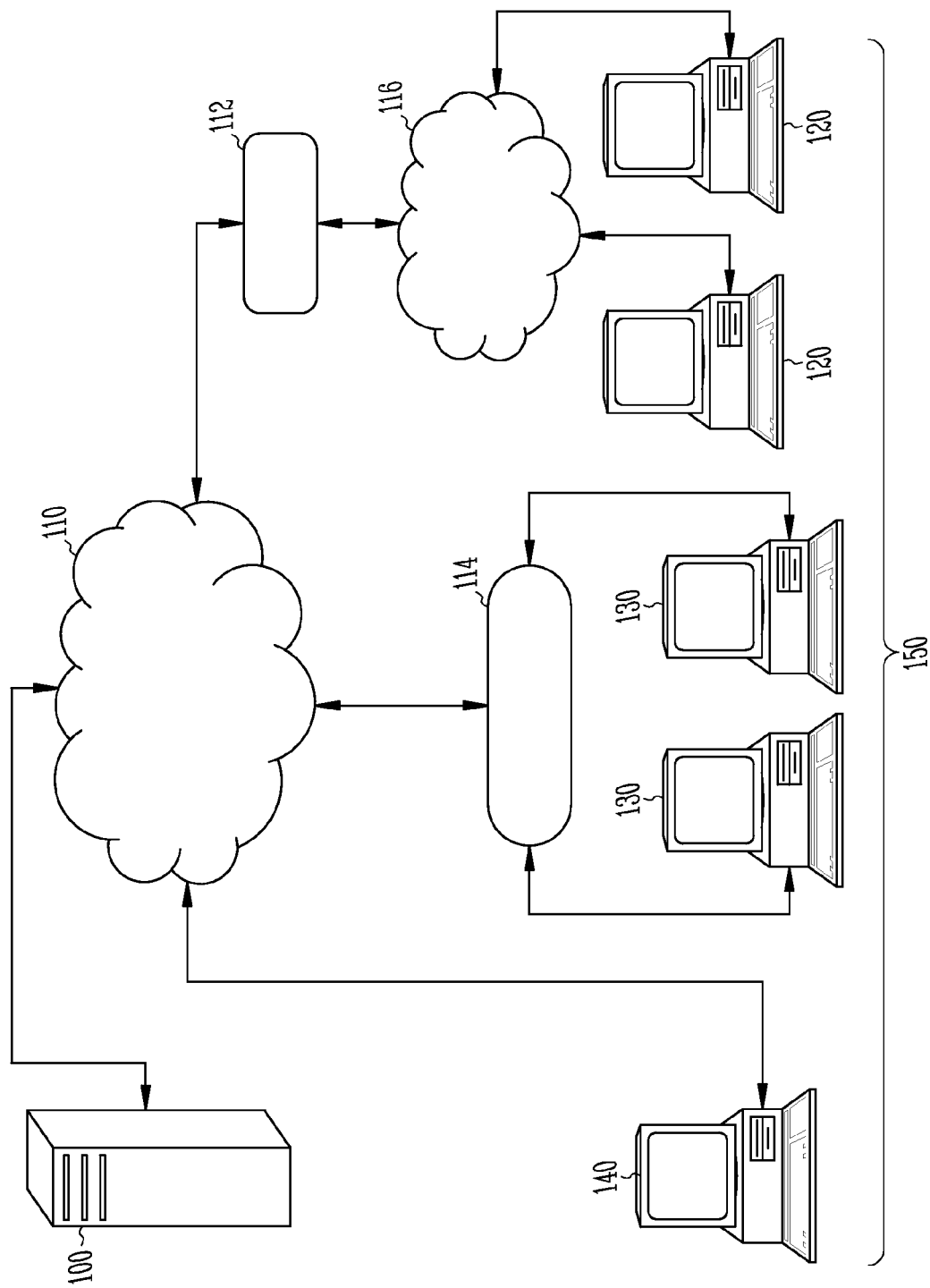
FIG. 1 is a block diagram of a network system on which an embodiment may operate.

A computer-implemented method and system for managing keyword bidding prices are disclosed. In the following description, numerous specific details are set forth. However, it is understood that embodiments may be practiced without these specific details. In other instances, well-known processes, structures and techniques have not been shown in detail in order not to obscure the clarity of this description.

An example embodiment of a computer-implemented method and system may manage keyword bidding prices. Initially, a host may develop and maintain a portfolio of keywords for which users can bid. In a manner described in detail in the above-referenced related patent applications, a host can search and select desired keywords for the portfolio and cluster the keywords into logical groups based on a variety of dimensional metrics. A data mining process is used to implement keyword affinity scoring. Clustering combines keywords into logical groups or clusters that share a similar behavior with respect to a considered dimension (or creative). A creative can be a template advertisement or message into which a keyword can be inserted. Sources for clustering techniques include: (1) "ex ante" information about a keyword (linguistic similarity, number of words in the keyword phrase, supply-side categorization etc.); (2) performance metrics (costs, clicks, return on investment (ROI), NS saturation, competitors, use of item level metrics, etc.); (3) internal sources (e.g., host search query history, host catalogues, host listings parsings, host affiliate query, catalog, and listing information, international search strings, paid search queries, etc.); and (4) external sources (e.g. Googspy, Yahoo buzz, etc.).

The computer-implemented method and system may also determine and use a correlation between different search queries in a single session. The correlation uses information based on the proximity of the different search queries and the subject matter searched in each query. For example, if a user submits a first search query (e.g. "John") and then subsequently in the same session submits a second search query (e.g. "John Smith"), a correlation can be drawn between those two keywords. This correlation can be used to form reasonable inferences related to the user behavior; because two related search queries appeared in sequence.

The performance metrics for a particular keyword or keyword cluster include a calculation of the value of a new user based on keywords. The effective use of advertising or messaging as related to keyword search queries enables the host to attract new users as a result of keyword based advertising. The effectiveness of a particular keyword or keyword cluster to attract new users is a key performance metric. One measure of this effectiveness is a Revenue per Click (RPC) scoring. If a particular keyword or keyword cluster and a related advertisement or message causes a user to click a link or icon, a certain value for that click through action can be calculated using RPC scoring. RPC scoring is based on a predicted value for a given keyword. The keyword scoring concept includes calculating the value of a new user brought in by a specific keyword or keyword cluster. In an example embodiment, as described below, additional data can be used to actually project a value forward in time. For example, a particular click-through might be worth $10 a click yesterday. However, there may be strong evidence the click-through is going to be worth $12 a click tomorrow, because of certain consumer variables that were observed (e.g., the volume of related listings may have skyrocketed, conversion rates may be skyrocketing, and ASPs are staying flat). Conversion is the act of a user clicking, responding, or otherwise taking action related to an advertisement or message. These consumer variables suggest that the keyword is going to be worth more tomorrow and into the future. In the example computer-implemented method and system, this forward looking analysis is done with the use of data mining and statistical analysis.

Revenue Per Click Prediction Model

Revenue Per Click (RPC) prediction is one building block for keyword scoring and value prediction. For this reason, it is desirable that the model be as accurate as possible. At its core, the example RPC prediction process described herein is a statistical approach to ascribing the likely future revenue for a given click for a given keyword. There can be a large number of potential inputs to this RPC prediction, including: past revenue and past click volumes, COFA (Category of First Activity) for users who have converted on a given word, or the Bid Density by Category for a keyword historically. In the end, a large number of x-variables can be used as inputs to the model while only a few inputs may actually be part of the calculation. However, because the relative weighting of the various variables (and even the variables themselves) is likely to change over time, the example computer-implemented method and system provide an extensible and flexible approach towards the RPC calculations.

To best use the example RPC model, the input data to the RPC model may be updated on a periodic basis, thus incorporating the newest information. This periodic update can be implemented by interfacing the RPC model with the Keyword Selection Module and the Keyword Datamart (KWDM) described in related patent applications referenced above. The efficiency of the RPC model can also be improved if the RPC model receives warning alerts as soon as possible if there is a problem with the periodic retrieval of RPC model input data.

One theme of the RPC modeling is global scalability, which includes international country-specific models using the same methodology as has been implemented for the RPC model in the US. This implies that the RPC model may be based on readily available data sources in every country. Country-specific RPC models are implemented for individual countries and for individual search engines to improve the regional accuracy of the RPC modeling.

Data Sourcing

As part of the periodic (e.g. daily) input data gathering process, the RPC Predictive Model may pull in keyword/user/category data from various internal and external sources that have been identified as potential predictors of a host's keywords' RPC and number of clicks. Various sources for this keyword data originate as described in the above referenced related patent application. Specifically, the keyword data can originate through the Keyword Testing Complex.

The Keyword Testing Complex is a shorthand name for the sourcing, selecting, adding, reporting, and deleting keywords cycle. The principal aim of this functionality, as described in detail below, is to facilitate the adding of good keywords and deleting of bad ones, provide control and reporting so users can easily run tests to determine the heuristics that matter in keyword selection and retention, and enable the automation of as much of the keyword testing, selection, and retention cycle as possible.

Figure 3:
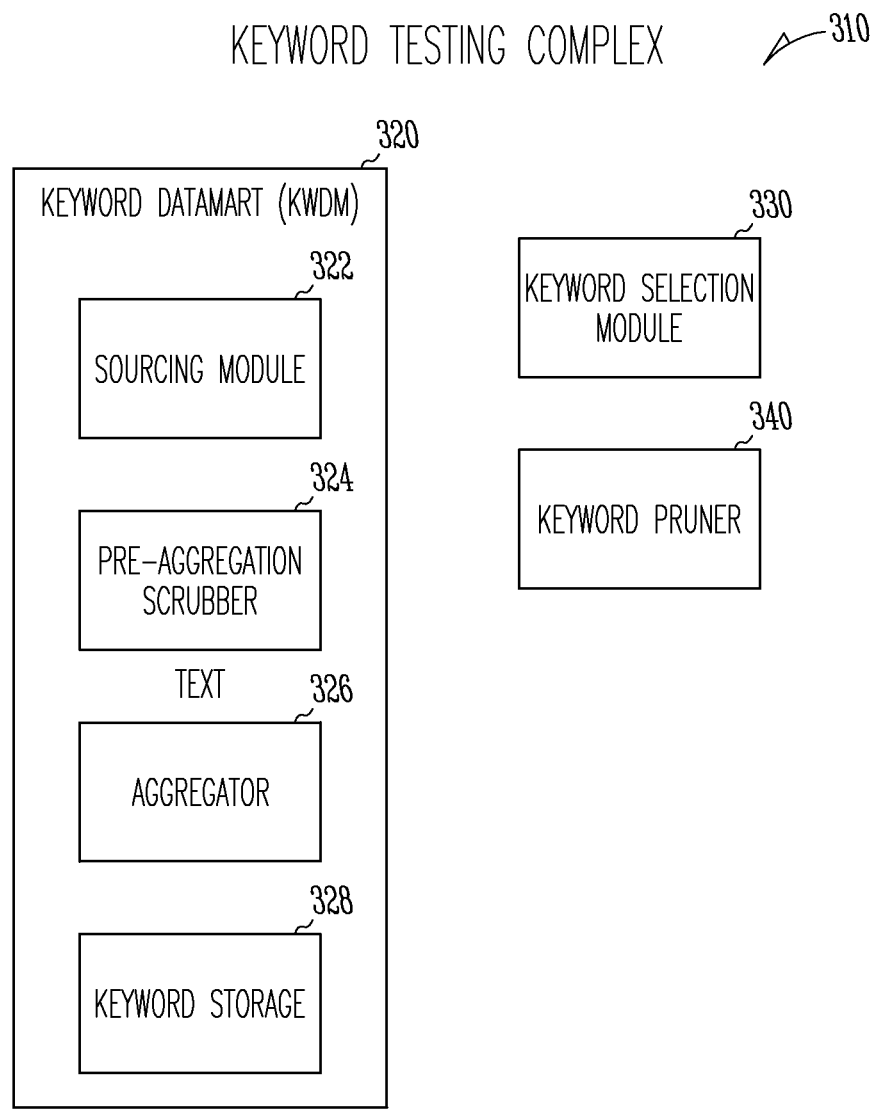
FIG. 3 illustrates the structure and components of the Keyword Testing Complex of one embodiment.
Figure 4:
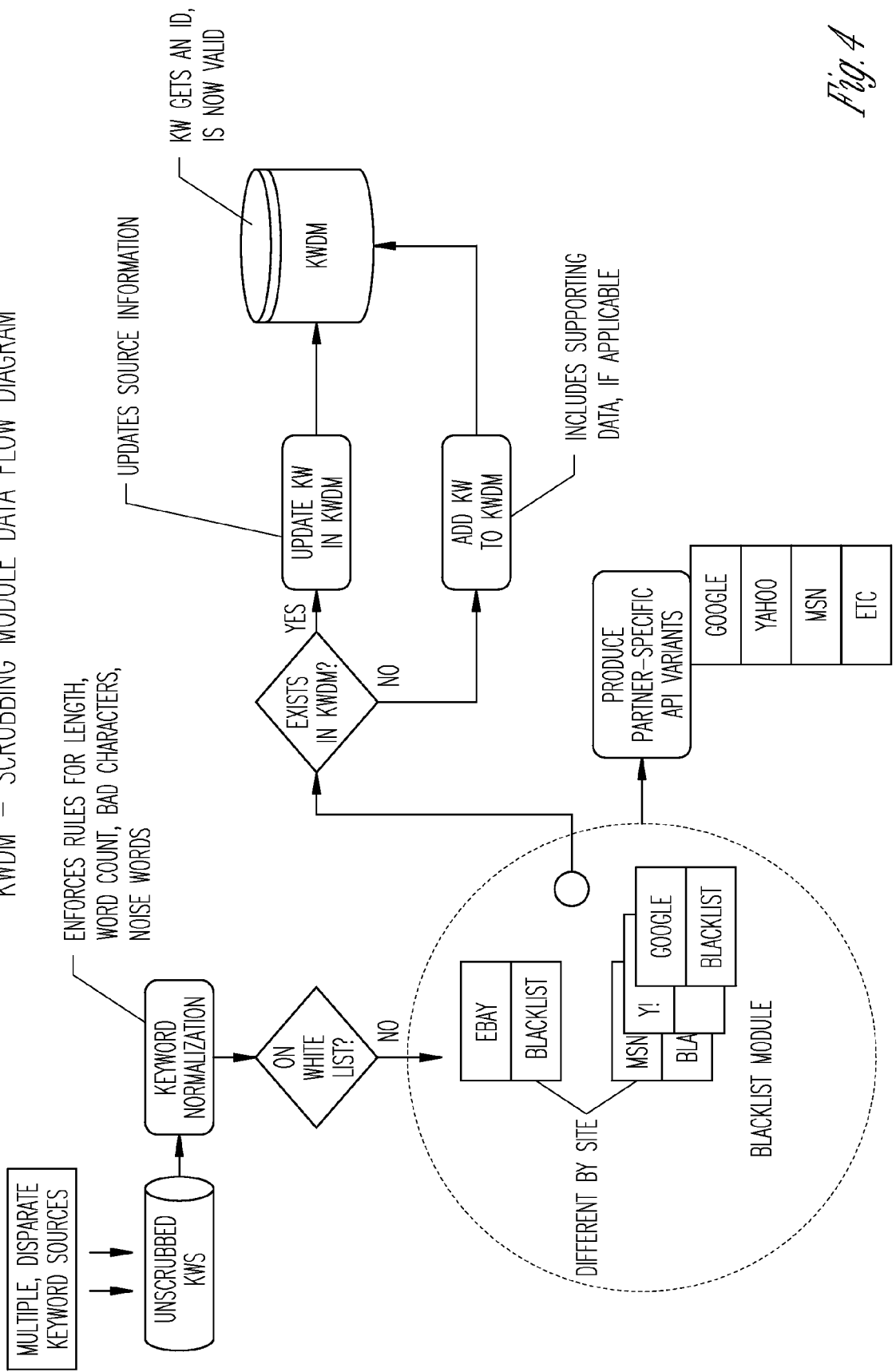
FIG. 4 illustrates the structure and flow of the keyword scrubbing module of one embodiment.
Figure 11:
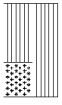
Figure 12:
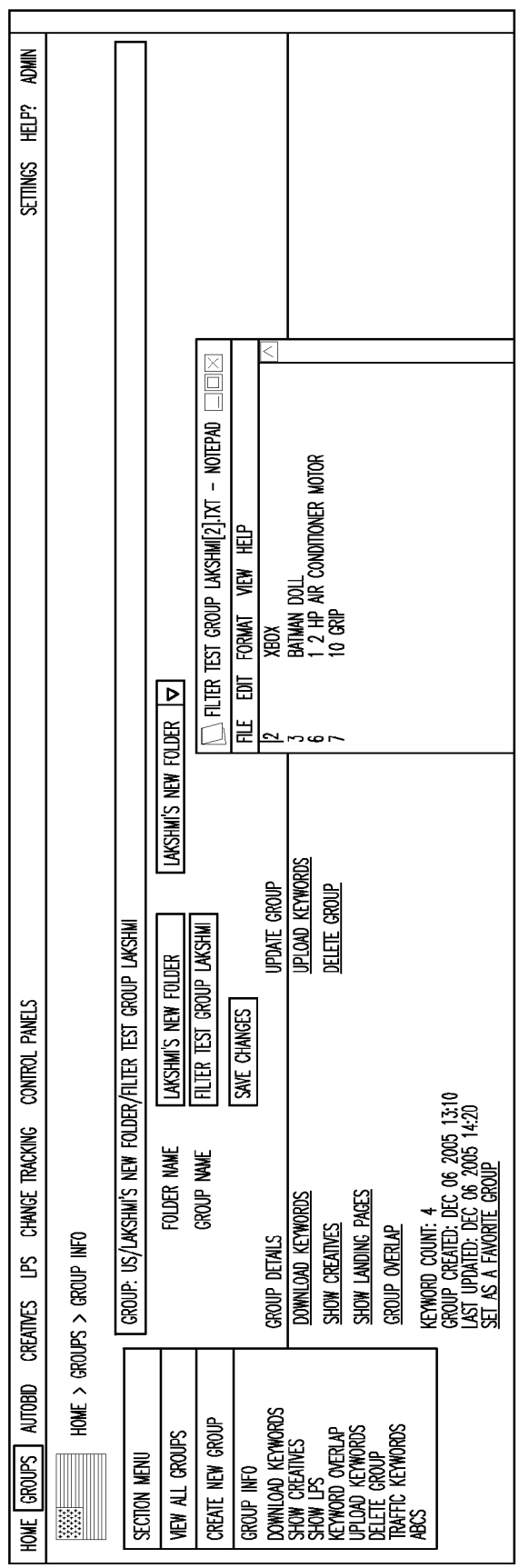

Referring to FIG. 3, a diagram illustrates the main components of the keyword test complex, according to an example embodiment. The keyword test complex 310 includes a keyword datamart, 320, a keyword selection module 330, and a keyword pruning module 340. The keyword data mart, 320 includes a sourcing module 322, a pre-aggregation scrubber 324, an aggregator 326, and keyword storage 328. The components of one embodiment of keyword datamart 320 are described in detail below.

Sourcing Module

The Keyword Sourcing Module 322 regularly pulls in keyword data from various internal and external sources that have been identified as potential sources of potentially revenue-generating keywords. Because each data source may have different dimensions and attributes, a generic and extensible data model is required. It is unlikely that many configurations settings or controls may be required to support keyword sourcing. A user of the technology described herein, denoted as a host, can use the Keyword Sourcing Module 322 to collect an initial unfiltered set of keywords from various sources. The following are some examples of important keyword sources that can be used. It will be apparent to those of ordinary skill in the art that other sources of keywords can similarly be used. Also note that there may likely be additional keyword sources that are important to various companies, organizations, countries or regions.

Internal—Host individually
        Host search query strings
        Host searches
        Host listing parsings
        Host catalogue listings
        Add a combination module as a list expansion tool (for instance have a list of action keywords (buy, cheap etc.), then match it to a give category, or combine keywords from different sources
    Internal—Host combined with $3^{rd}$ parties
        Affiliate query strings
        Natural search query strings
        International keywords
        Paid Search query strings
    External: (Well known sources of keywords, e.g.)
        Googspy
        Yahoo buzz
    Ad Hoc
        Generic User Upload utility for ad hoc keyword list additions
        "Keyword blender" which takes existing keyword strings and recombines the words into new keyword strings.
        Duplicate keywords may be allowed on Google if they have different Match Types as is currently available through the well-known Google interface.

As related to RPC modeling, keyword data can be sourced using the Keyword Testing Complex and the Sourcing Module 322. In addition, other keyword data sources include the following.

Metrics (By Date/By Keyword):
    Cost
    Revenue
    Retention Bidders
    Retention Bids
    Acquisition Bidders
    Acquisition Bids
    ACRU's
    Clicks
    Average Position Keyword Categorization: (Bid Categorization for Top n categories)
    Category Percentage Weighting
    Site ID
    Meta Category
    Level 2
    Level 3
    Level 4
    Level 5
    Level 6

Search Categorization for Top n categories
    Category Percentage Weighting
    Site ID
    Meta Category
    Level 2
    Level 3
    Level 4
    Level 5
    Level 6

Prior Month by Category
    ASP
    Conversion Rate
    Success Item Count
    Revenue Category Data
    External Category Clustering User Level:
    Sets—Retained Bidders, Acquired Users
    User
    Value
    RFM
    Zip
    CoFA—(Category of First Activity)
    Mosaic
    Demographic Keyword Data Aggregation Module (Aggregator)

Keywords in the KWDM 320 may contain various levels of dimension data. For example: 1) global dimensions (e.g. linguistic dimensions), 2) traffic dimensions (internal and external data), 3) clustering dimensions, and 4) source specific metrics. These dimensions are described in more detail below. Because many of these dimensions change from day to day, the aggregator 326 defines a time period of measurement for each metric. It may not be necessary to repopulate all of these metrics every day for every keyword. A weekly, monthly or quarterly refresh may be sufficient in some cases. A mechanism to track the source (and number of occurrences per source) by keyword is also a desired feature. As examples of dimensions (non-exhaustive):

a. Global Dimensions
   component words
   number of words
   "fingerprint": the keyword's words sorted alphabetically, so that "ipod mini" and "mini ipod" would map to the same fingerprint—this may be used to generate simple linguistic matches
   Part of Speech (noun, verb, adjective, etc)
   Similar to part of speech—action words (e.g. buy, sell, etc.)—allows for keyword combinations
   linguistic affinity matching (e.g. a score for keyword pairs which indicates their "likeness" based on the words they share)
   Predicted Revenue per Click (RPC) (from "best available" RPC model)
   number of host search results
   number of searches on Yahoo/Overture in a time period
   Purged/Tested status flag b. Traffic Dimensions
   Trafficked on Search Engine xyz
   Sourced from Site abc
   By Search Engine
      Current Cost per Click (CPC) (bid) (if trafficked)
      Avg. CPC (last 30 days)
      Avg. Position (last 30 days)
      Cost
      Revenue
      Clicks
      Impressions
      Bids
      Confirmed Registered Users (CRU)
      Acquired Confirmed Registered Users (ACRU)
      Host Search Volume c. Clustering Dimensions
   Category Affinity (potentially multiple approaches)
   Value for Confirmed Registered User (VCRU) by keyword
   Revenue per Click (RPC) Predictive Model Score
      Predicted RPC
      Predicted Clicks
   Creative/Landing Page Cluster
   Metrics as required to support clustering
      User Metrics
      Category Metrics d. Source-Specific Dimensions (extensible)
   Affiliate queries
      Affiliate ID
   International
      Country
      Revenue
      Clicks
   Natural search
      Revenue
      Cost
   Host searches
      number of queries in prior unit of time
      number of bids resulting from word
      number of listings resulting from word
      Revenue resulting from word
   Query String map
      Map of query strings which have been seen associated with keyword strings in paid search data Referring to FIG. 5, an example of the metrics processed by aggregator 326 is illustrated. Because many of these statistics change from day to day, the aggregator 326 documents from what period of time the statistic is taken. It may not be necessary to repopulate all of these statistics every day. A monthly or quarterly refresh may be sufficient. For statistics involving the actual cost and revenue for the trafficked word for the host, the aggregator 326 incorporates new data with the old data. If a keyword comes in more than once from the same source, the aggregator 326 can increment the number in the appropriate source column. If the keyword is seen from a new source, the aggregator 326 increments the relevant source column.

Keyword Selection Module (Selector)

The Keyword Selection Module 330 is shown in FIG. 3. In one embodiment, there are two ways to select keywords to be added: manually and automatically.

Manual Method

The user can run ad hoc queries on any of the fields to retrieve any set of keywords. Standard logic is supported (e.g. and, or's, joins, etc.).

The user can sort according to any of the fields in the aggregator 326.

The user can export the query result

The user can create a list with the query results

The user can save query parameters

Automatic Method

The user can specify which metrics have been deemed to be useful predictors for valuable keywords (via heuristic testing or based on external models), and the keyword testing complex 310 then uses these criteria to automatically select keywords to be trafficked. This query can be generated by a configurable set of criteria that can be pre-set and executed at regular intervals.

Any other metric tracked by the aggregator 326 can be available as an input into the automatic keyword selector 330.

The computer-implemented method and system for managing keyword bidding prices disclosed herein provide a set of data-driven controls that allow users to manage keyword bidding prices at the keyword level and at a large scale. The computer-implemented method and system include a rules engine to manage the spend associated with purchasing and managing a keyword portfolio. The data-driven controls include controls to manage spend and high-volume. A few of the features of an example embodiment include the following:

The ability to update cost per click (CPC)/bid amounts for keywords across the entire keyword portfolio in an automated fashion at any time.

A host can update its bids on the entire keyword portfolio, while factoring in different user behavior at different times in the day (e.g. day-parting and the ability to raise bids right before lunch when online activity is the highest and lower the bids after midnight when activity is the lowest).

The ability to automatically control keyword bids to target a specific position and percentage factor above or below the current bid, based on what a host is willing to pay for a group of keywords.

Flexible architecture that supports multiple search partners. Example embodiments can support simultaneous bidding on different search partners (e.g. Google and Yahoo/Overture) that have completely different keyword concepts and attributes and can easily scale to add new search partners (e.g. MSN).

Bid Optimization

CPC Bid Optimization of example embodiments described herein is an element to trafficking keywords and ensuring a host is maximizing its return on investment (ROI) on each keyword purchase. Because different search engines have different interfaces, policies, and rules associated with keywords and paid search opportunities, an automated bid optimization system may have to take these search engine-specific differences into account. Below are example considerations for search engine-specific bidding methodologies (e.g. Google and Yahoo/Overture). Based on each search engine's current bidding methodology, specific business rules and a customized RPC Predictive Model has been created as part of the computer-implemented method and system described herein that will enable more efficient CPC bid optimization.

Example Yahoo/Overture Search Marketing Bidding Strategy

Sample Components:
1. Input A: RPC per Keyword
2. Input B: Yahoo/Overture Search Marketing Listing Attributes (e.g. keyword, title, URL, listingID, match type, etc.)
3. Input C: Competitor Bid Landscape
4. Input D: AutoBid Controls (see FIG. 10)
5. Bidding Logic
6. Output: New $CPC_{max}$ per Keyword to update through API Input A:
The RPC per Keyword score can be produced using the RPC Predictive Model described in the above-referenced patent applications.

Input B:
A listing ID can be associated with every keyword in the host portfolio. Through an application programming interface (API), all attributes for each specific keyword in the portfolio can be made accessible to external systems. In an example embodiment, the specific API call is <GetListings>, where the following sample attributes can be returned. It will be apparent to those of ordinary skill in the art that a different set of attributes may similarly be returned:
Listing ID—unique ID per keyword
URL—landing page
Category ID—Yahoo/Overture specific category
Bid Type—default can be "auto"
Search Term—keyword
Minimum Bid
Title
Description
Market—Country
Content Bid—CPC of Content Match
Content Online
Content Opt In—Content Match on/off
Advanced Opt In—Broad Match on/off
Advanced Click Index
Click Index
Online—keyword on/off status
Bid—CPC Input C:
Through the API, a unique bidding landscape can be returned for every keyword in the portfolio. In an example embodiment, the specific API call is <GetMarketState> which returns the following sample parameters:
Listing Rank—position
Bid—CPC
Site Host—Advertiser's website Input D:
A series of AutoBid Controls are defined and made available. A single Control is associated with one or more keywords. These controls are used by the Bidding Logic to make different bidding decisions for each keyword. In an example embodiment, the specific Controls can include the following: (also see FIG. 10):
Default Minimum CPC—The minimum CPC we can bid for any keyword.
Default Maximum CPC—The maximum CPC we can bid for any keyword.
RPC Scaling Factor—The amount by which all RPC's can be adjusted. Used to produce the Scaled RPC value (Scaled RPC=RPC*RPC Scaling Factor).
Deviation Scale Up Factor—For bids above scaled RPC, adjust the bid by this factor.
Deviation Scale Down Factor—For bids below scaled RPC, adjust the bid by this factor.
Gap Position Target—The position in the gap where we want our new bid to be.

Bidding Logic of an Example Embodiment

An example is presented below for Yahoo/Overture.

Based on the current Control, determine the Scaled RPC for a keyword. Then use the Competitor's Bid Landscape to find the competitors bid closest to our Scaled RPC. Closeness is defined as abs (Scaled RPC—Competitor's Bid)*Deviation Scale Up/Down Factor (depending on if the Competitor's Bid is above of below our Scaled RPC). Having identified the closest bid, we now bid to "beat" that competitor's bid. In order to beat the competitor's bid, we need to know what the gap is between that competitor and the next highest competitor. Once we know what the gap is, then we bid at a position within the gap as defined by (Control: Gap Position Target). For example, if our Gap Position Target is 50% and there is a 10 cent gap between our closest competitor's bid and the next higher competitor's bid, we would bid 5 cents higher than our closest competitor's bid.

The Control also limits our bid to the defined default minimum and maximum boundaries.

The RPC is a desired bid value the advertiser is willing to pay. Clearly, the advertiser seeks to optimize the RPC so the lowest value is paid while retaining an acceptable level of user click-throughs. The current position corresponds to a location on a search results page relative to the position of other advertiser's (competitors) on the same page in relation to the same keyword. Typically, a search engine will position a highest bidder's advertisement at the top (or in the position most likely to attract user click-throughs) of the search results page. The next highest bidder's advertisement is positioned just below the highest bidder's advertisement. This ranking continues until there is no space left on the search results page or the number of advertisements exceeds a search engine's maximum. In this manner, the search engine's advertisement placement corresponds to keyword bid values and the corresponding number of expected user click-throughs. As is well known, a search engine is paid the bid value by the advertiser for each user click-through.

For example, take the keyword example "maple wood". The bid landscape tells us that we are currently paying $0.27 for position 3. "Position −1" places us in position 2 (a better position than position 3 in terms of the number of expected user click-throughs) with a maximum bid of $0.27 and the deviation of ~$0.03 from our scaled RPC of ~$0.25. "Position −2" places us in position 1 (a better position than position 2 in terms of the number of expected user click-throughs) with a maximum bid of $0.28 and the deviation of ~$0.04 from our scaled RPC.

Using the bidding logic shown above, determine the bid to beat. From there, the minimum deviation is selected from the four surrounding positions. Once the optimal gap is determined, a new maximum CPC is determined based on the process described above. There are two special cases that are also handled by the process detailed herein. Specifically, if the new bid puts us in the first position, there is no gap as there is no next higher competitor's bid. In this case, we bid 1 cent more than the next lower competitor position. Similarly, if there are no bidders in the bid landscape, we can bid the minimum. See FIG. 6 for an example of the parameters generated as a result of the process described above for a sample Yahoo/Overture bidding strategy.

Using the process described above, parameters are generated for a sample Yahoo/Overture bidding strategy. These parameters can be used to create the XML syntax to make the appropriate CPC changes through the API.

Example Google Bidding Strategy

Sample Components:
1. Input A: RPC per Keyword
2. Input B: Last Bid/Click Date/Impression Date per Keyword.
3. Input C: Current Day's Keyword Report
4. Input D: AutoBid Controls (see FIG. 9)
5. Bidding Logic
6. Output: New $CPC_{max}$ per Keyword to update through API Input A:
The RPC per Keyword score can be produced using the RPC Predictive Model described in the above-referenced patent applications.

Input B:
This input is used to determine how long it's been since the last impression; last click; last bid update; and what the last bid value was. The Bidding Logic uses this information in coordination with the Control values to make unique decisions for each keyword.

Input C:
Through the API, the host can generate an automated report that returns the current day's data for each keyword. Based on the time that the API call is made, the report will return [Current Time—12:00 AM] hours of data. For example, the report may return the following parameters:
Campaign
Ad Group
Keyword
Keyword Matching
Keyword Status
Keyword Minimum CPC
Current Maximum CPC
Destination URL
Impressions
Clicks
CTR
Average CPC
Cost
Average Position Input D:
A series of Controls are defined and made available. A single Control is associated with one or more keywords. These controls are used by the Bidding Logic to make different bidding decisions for each keyword. In an example embodiment, the specific Controls can be as follows: (also see FIG. 9):

Default Minimum CPC—The minimum CPC we can bid for any keyword.
Default Maximum CPC—The maximum CPC we can bid for any keyword.
RPC Scaling Factor—The amount by which all RPC's are adjusted. Used to produce the Scaled RPC value (Scaled RPC=RPC*RPC Scaling Factor).
Bid Ceiling Factor—The bid amount should never exceed the Bid Ceiling Factor*Scaled RPC.
Bid Increment Factor—Limit all bid amount increases to no more than this percentage change.
Bid Increment Velocity Factor—The amount to adjust the final bid by during upward movements of the bid.
Bid Decrement Factor—Limit all bid amount decreases to no more than this percentage change.
Bid Decrement Velocity Factor—The amount to adjust the final bid by during downward movements of the bid.
Max Acceptable Average Position—This is the goal for the average bid position. If we are spending less than the scaled RPC and the average position is greater than this, our bid should be increased.
No Activity Delay Period—When there is no activity (e.g. no clicks, no impressions), don't take any action until the No Activity Delay Period has elapsed.
No Clicks Increment Factor—When there are no click events during the No Activity Delay Period, increase the bid amount by the No Clicks Increment Factor.
No Impressions Increment Factor—When there are no impression events during the No Activity Delay Period, increase the bid amount by the No Impressions Increment Factor.
Initial Bid Scaling Factor—The first bid for a new keyword is the (RPC*RPC Scaling Factor*Initial Bid Scaling Factor). Note, the initial bid must be below the Bid Ceiling, otherwise the Bid Ceiling value will be used instead.
Default RPC—The RPC value to use when no other RPC has been determined for the keyword.

Bidding Logic of an Example Embodiment

Based on a current scaled RPC (revenue per click) value, use the previous day's $CPC_{max}$ and previous day's keyword-level data to calculate:
A. [$ Deviation]=[RPC−$CPC_{avg}$]
B. [% Deviation]=[$ Deviation]/RPC
C. Calculated $CPC_{max}$=(1+% Deviation)×[previous day's $CPC_{max}$]
D. $CPC_{ceiling}$=RPC*(1+X)], where X=scalable margin The new $CPC_{max}$ may be calculated based on the following logic:
If (A=n/a), $CPC_{max}$=D
Otherwise, If (previous day's $CPC_{avg}$)>a pre-defined average position, $CPC_{max}$=min(C, D)
Else If (previous day's $CPC_{avg}$)≤a pre-defined average position, $CPC_{max}$=min(D, previous day's $CPC_{max}$)

New $CPC_{max}$ may be bounded by the following rules:
Final $CPC_{max}$=min[max(new $CPC_{max}$, Y), D]
Where Y=$CPC_{min}$ per keyword based on Google's QBB Implementation For example, take the keyword example "longaberger pottery" and the corresponding sample parameters below.
A=0.52
B=78.7%

C=1.38
D=0.85
Based on the bidding logic above, since (A≠n/a) and [(previous day's $CPC_{avg}$)≤1.5] is true, then:

$CPC_{max}$=min(D,previous day's $CPC_{max}$)=min(0.85, 0.77)=0.77

FIG. 7 illustrates an example of the parameters generated as a result of the process described above for a sample Google bidding strategy.

Output:

Using the process described above, parameters are generated for a sample Google bidding strategy. These parameters, including the new $CPC_{max}$, can be used to execute the corresponding bid changes through Google's API.

Other Bidding Strategies

Variations of the bidding processes described above can be used to support other search engines. Further, a generic version of the bidding optimizer described herein can output or export a flat file for manual loading on other platforms. In addition, variations of the bidding processes described above can include time of day/hour optimization and demographic targeting.

Automatic Bid Control Management

FIGS. 8-12 are sample screen snapshots of a user interface for an example embodiment for controlling parameters used in the automatic bid control system. In the automatic bid control (ABC) system of an example embodiment, the process of controlling various bid parameters across a variety of search engines can be automated. As described above, various thresholds, scaling factors, time periods, increment factors, and the like can be preset so the bid optimization process can be efficiently executed automatically and remain within preset bounds.

Match Type Automation

The Match Type Automation functionality provided in the computer-implemented method and system described herein enables a host to automate the decision-making process as to which keywords to buy on the different Match Types offered by the conventional search engines (e.g. Advanced/Standard match types on Overture, and Broad/Phrase/Exact match types on Google).

In particular, the functionality of the present computer-implemented method and system automates the decision-making related to:

Specifying which new user queries to buy on Exact/Standard Match.

Deciding when to change the match type from Advanced (Broad) to Standard (Exact Match), for the original keyword that led to the new user queries in (a).

Recommending the initial CPC (bid) to submit.

In addition, the functionality of the present computer-implemented method and system also provides additional functionality. When submitting keywords to buy on a search engine, the user can specify the desired Match Type. The user can check the Match Type status of any keyword, list of keywords, or keyword cluster at any time. The user can also manually change the Match Type status of any keyword, list of keywords, or keyword cluster at any time. When an embodiment is about to switch some existing keywords from an Advanced match type to a Standard match type, the embodiment generates a report specifying the list of keywords that have been recommended to be switched over to Standard Match. The embodiment advises the user of the recommended changes prior to trafficking the changes. An example embodiment also allows the user to switch from Advanced to Standard match type automatically on a periodic basis (e.g. monthly). Alternatively, the match type switching can be configured to occur only after being accepted by the user, in the event the user wishes to review the recommended list of words first. This would enable the ability to override recommendations.

Some conventional keyword processing systems store even the slightest differences in user queries as distinct queries/records. For example, two phrases may have the same keywords, but one may have an additional space in the keyword string. Conventional systems create distinct records for these keyword variations even though these variations would be considered the same keyword in some conventional search engines (e.g. Overture's Match Driver Logic), thus triggering the display of the same advertisements. Thus, it is beneficial to be able to mimic the Match Driver Logic of a particular search engine to the extent possible. The following pre-processing actions can be implemented to increase the likelihood that the keyword processing will mimic the operation of the Match Driver Logic of a particular search engine.

Singular/Plural: Treat all versions of user queries to be the same if they are singular/plural versions. In one embodiment, one can compare all the user queries with each other and convert all keyword variations to a common form (e.g. the singular form). Then for every record, compare the keyword with the user query: if the user query is a singular or plural version of the keyword, then set the user query to be the keyword. If it is not feasible (computationally expensive) to check all user queries against each other first, then the following actions can be implemented.

For each record, compare the keyword with the user query: if the user query is a singular or plural version of the keyword, then set the user query to be the keyword. Here are some of forms of singular/plurals that illustrate the user query conversion:

(ES)—beach vs. beachES (S)—train vs trainS (IES)—baby vs. babies

When moving a keyword to exact match, both versions (singular AND plural) should be provided.

Lower/Upper Case: Conventional systems store the same phrase separately if it was entered in lower case vs. upper case. An example embodiment converts all user queries to a common case (e.g. lower case).

Word Re-ordering: In one embodiment, all user queries are compared together before comparing them against keywords. In another embodiment, the user queries are checked to determine if they are simply a reordering of words of the keyword. If so, set the user query to be the keyword. For example, the user query, 'Paid Search Alley Rocks' would be made the same as 'Rocks Alley Search Paid'.

Filler words: The Match Type Automation functionality provided in the computer-implemented method and system described herein suppresses words such as 'and' '&' '+' 'the' 'a', space, and some special characters, etc.

Multiple spaces between words: If multiple spaces appear between words, the spaces are compressed to one space.

Quotation Marks around/within queries: Quotes (single or double quotes) can be removed from a user query.

Misspellings: In one embodiment, misspellings in a user query can be corrected.

Match Type Processing

The following actions can be used in various embodiments to process user queries and related keywords for various conventional search engines.

1) Retrieve all keywords from a search engine that had more than a threshold number of clicks (e.g. >=100 clicks) in a previous time period (e.g. 2 months).
2) Extract all user queries for each of the keywords in step 1 in a previous time period (e.g. two months).
   a. Also retrieve metrics such as the number of clicks and the number of bids for that keyword & user query combination/record.
   b. Delete any record that has a blank user query stored.
3) In the user query, replace any %XY characters (encoded Hex characters) with a blank.
4) As described above, mimic the Match Driver processing by performing the following actions in the following order. These steps may not be necessary for support of Google:
   a. Convert the keyword & user query to lower case.
   b. Replace '+' and '&' in the user query with blanks
   c. Replace ' a', 'the' 'and' in user query with blanks (Note the padded pre & post spaces in these strings ensures these strings are not replaced if they are part of a word; they are only replaced if they appear between words).
   d. Delete any occurrences of single or double quotes in the user query.
   e. Compress multiple spaces between words to be one space.
   f. If the user query is a singular or plural version of a keyword, set the user query to be the keyword.
5) Group all records by keyword and user query. Get aggregate metrics at this level.
6) For each keyword, calculate and store the following fields:
   a. Count of number of associated user queries.
   b. Sum of clicks across all user queries.
   c. Sum of Bids across all user queries.
   d. Note that the sum of clicks or bids across all user queries for a given keyword, is not always the same as the number of clicks or bids for the keyword.
7) Based on the sum of clicks or bids across all user queries for a given keyword and given that the keyword level Costs & Revenue is known, assign costs & revenue (and thus profit) to each user query. Use the ratio of clicks/bids at the user query level, relative to the Total clicks/bids across all user queries for that keyword (as calculated in step 6 above) to allocate the appropriate amount of keyword Costs/Revenue to the user query in question.
8) Choose all user queries that were profitable and had a quantity of clicks greater than a configurable threshold of click activity (e.g. >=50 clicks) thereby ensuring a minimum threshold of 'popularity' for the user query. Buy these profitable user queries on Standard Match.
9) Set the initial recommended CPC for these Exact Match buys (e.g. 75%*user query—cost/user query—clicks). Establish a floor bid value (e.g. $0.10) and a ceiling bid value (e.g. $0.75). In the event a profitable user query record is associated with more than one keyword, specify the initial CPC using the metrics of the most profitable record.
10) When buying these profitable user queries on Standard Match, check to make sure the user query is not the same as the keyword. In other words, leave the original keyword on Advanced so user queries can continue to be flagged, unless specified by the following checks. This step may not be necessary for support of Google as one can have the same keyword phrase on Broad & Exact match types simultaneously. If the number of clicks associated with the record where the user query equals the keyword is greater than a configurable percentage (e.g. 90%) of total clicks across all the user queries for that keyword, then buy that user query (and thus the original keyword) on Standard Match. If the original keyword is itself the most frequent user search query by far and generating almost all the clicks anyway, then it makes sense to buy the query on Standard Match, thus getting preferred status.

Figure 13:
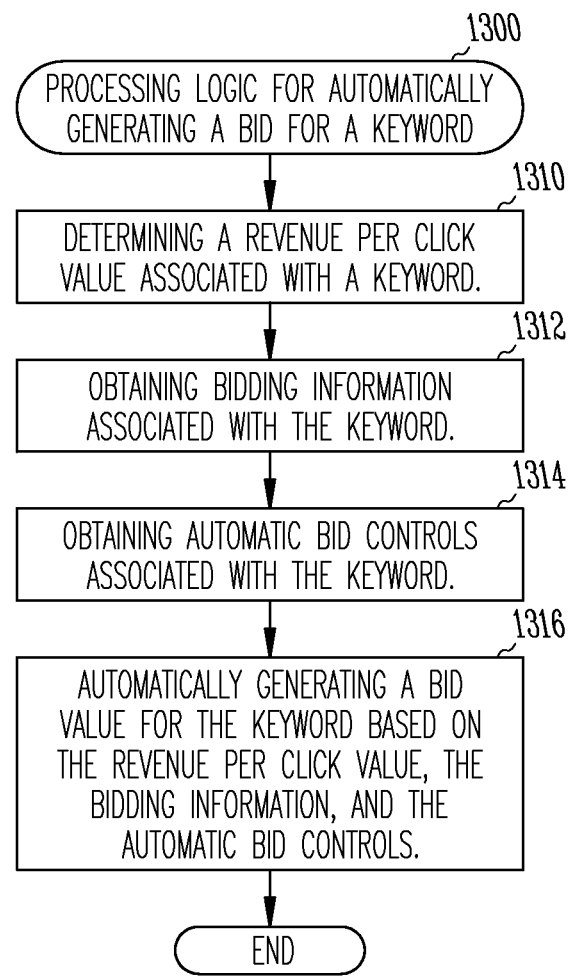
FIG. 13 illustrates the processing logic used in an example embodiment.

FIG. 13 illustrates processing logic associated with an example embodiment. In a first processing block 1310, the example embodiment determines a revenue per click value associated with a keyword. In processing block 1312, the example embodiment obtains bidding information associated with the keyword. In processing block 1314, the example embodiment obtains automatic bid controls associated with the keyword. In processing block 1316, the example embodiment automatically generates a bid value for the keyword based on the revenue per click value, the bidding information, and the automatic bid controls.

Figure 14:
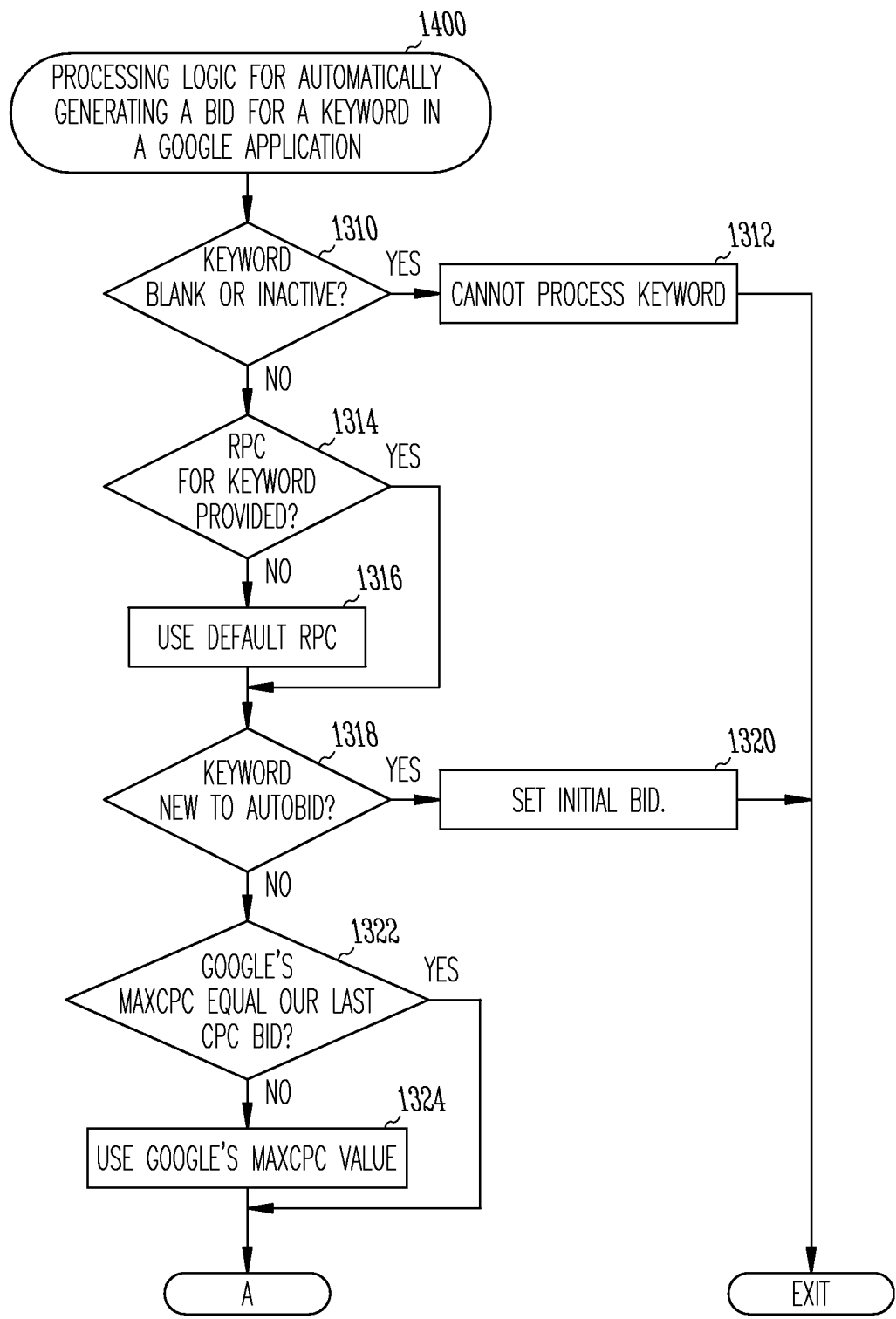
FIGS. 14-16 illustrate processing logic associated with another example embodiment associated with the automated bid logic for a Google application.
Figure 15:
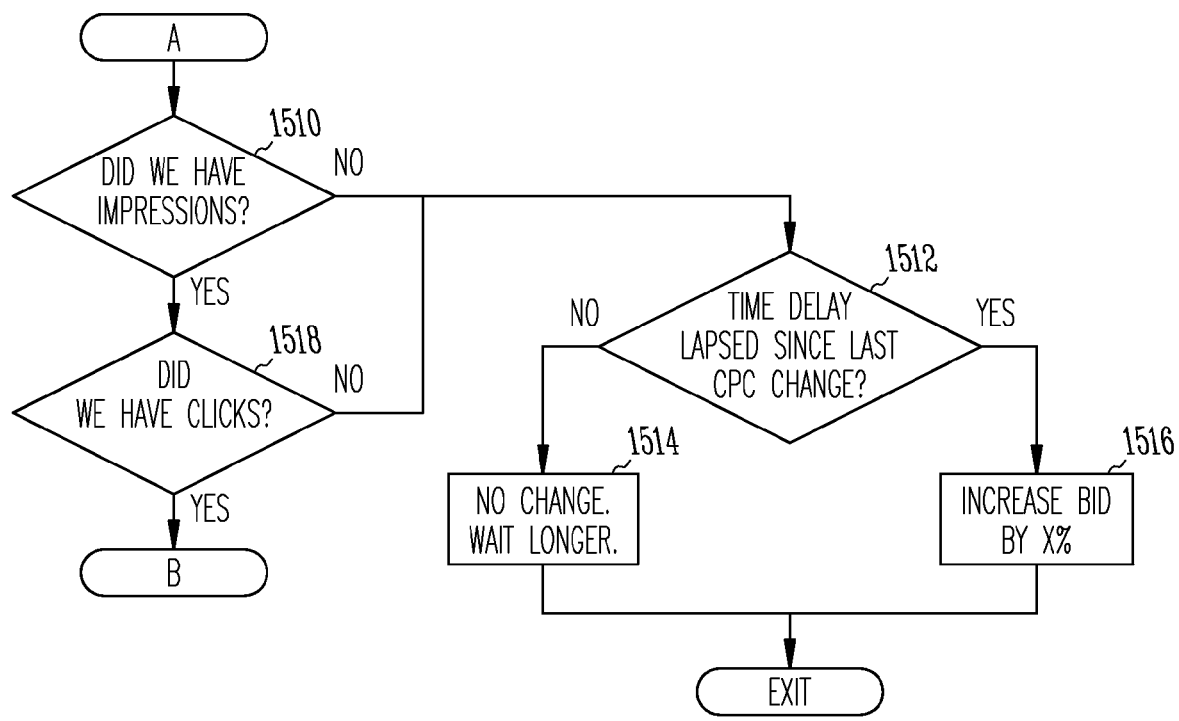
Figure 16:
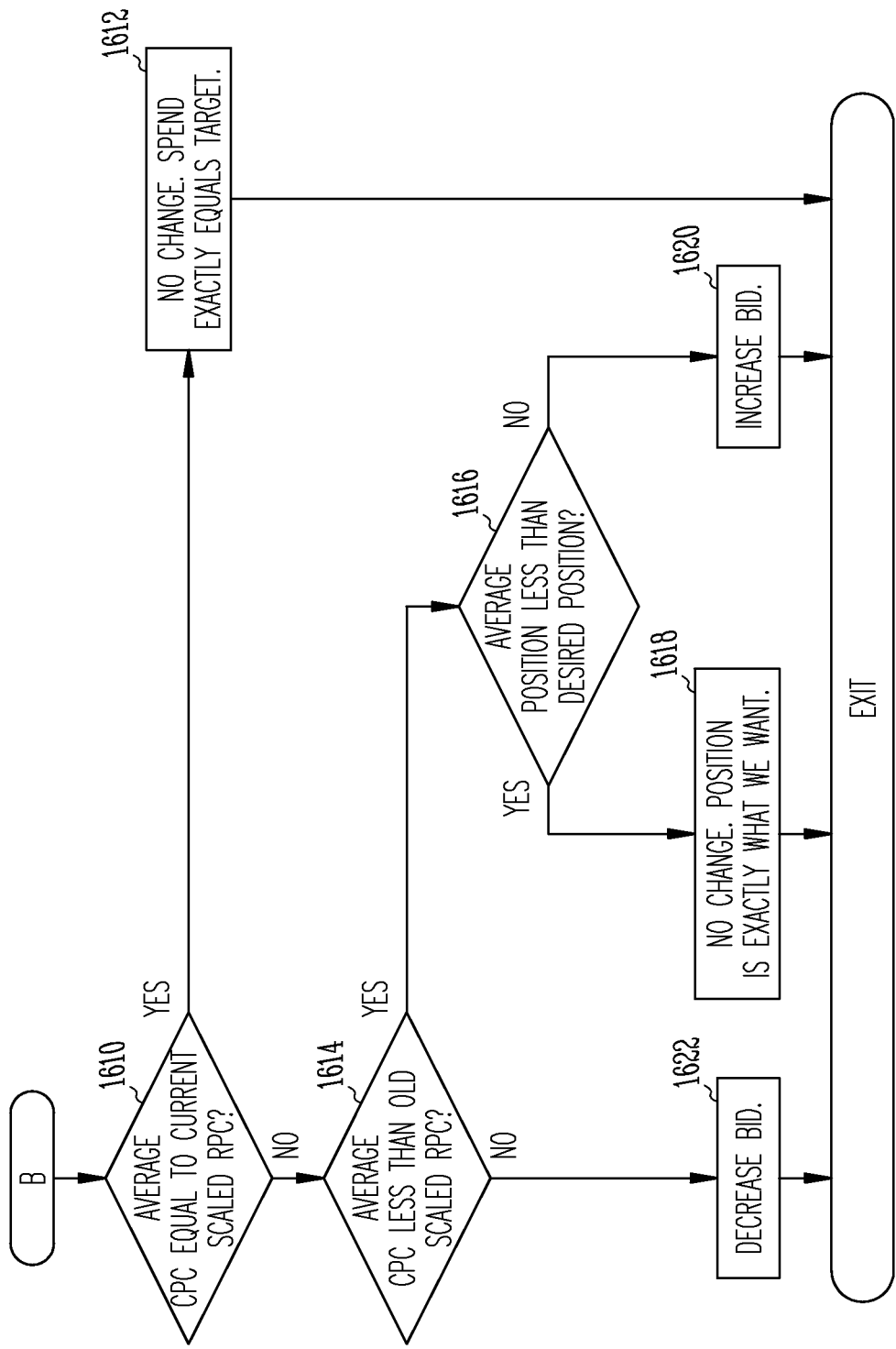

FIGS. 14-16 illustrate processing logic associated with another example embodiment associated with the automated bid logic for a Google application. Referring to FIG. 14, an initial check is made to determine if an input keyword is blank or inactive (decision block 1310). If so, processing terminates through block 1312. If an RPC value is not provided for the valid keyword, a default RPC is used in block 1316. If the input keyword is new to the automated bidding process (decision block 1318), an initial bid is set in block 1320. Otherwise, a check is made to determine if the Maximum CPC value provided by Google data is equal to our last CPC bid (decision block 1322). If not, the Google Maximum CPC value is used (block 1324). Processing continues at the bubble A shown in FIG. 15.

Referring to FIG. 15, processing continues at the bubble A. In decision block 1510, an initial check is made to determine if we have received impressions. If not, a check is made to determine if a time delay has lapsed since the last CPC change (decision block 1512). If not, no change to the bid is made (block 1514). If the time delay has lapsed since the last CPC change, the bid is increased by a predetermined increment of x % (block 1516). In decision block 1518, a check is made to determine if we have received clicks. If not, a check is made to determine if a time delay has lapsed since the last CPC change (decision block 1512). If not, no change to the bid is made (block 1514). If the time delay has lapsed since the last CPC change, the bid is increased by a predetermined increment of x % (block 1516). Processing continues at the bubble B shown in FIG. 16.

Referring to FIG. 16, processing continues at the bubble B. In decision block 1610, an initial check is made to determine if the average CPC value is equal to the current scaled RPC value. If so, no change to the bid is necessary as the spending exactly equals the target (block 1612). In decision block 1614, a check is made to determine if the average CPC value is less than the old scaled RPC value. If so, a check is made to determine if the average position is less than the desired position (decision block 1616). If so, no change to the bid is necessary as the position is exactly what we want (block 1618). If the average position is not less than the desired position (decision block 1616), the bid is increased in block 1620. If the average CPC value is not less than the old scaled RPC value (decision block 1614), the bid is decreased in block 1622. Processing for the example embodiment terminates at the End bubble.

Referring now to FIG. 1, a diagram illustrates the network environment in which an example embodiment may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Figure 2A:
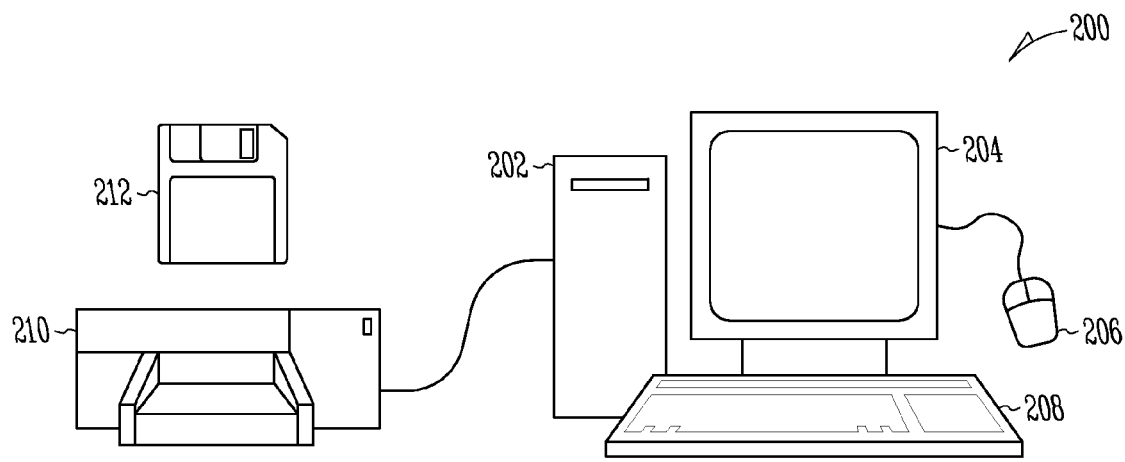
FIGS. 2a and 2b are a block diagram of a computer system on which an embodiment may operate.
Figure 2B:
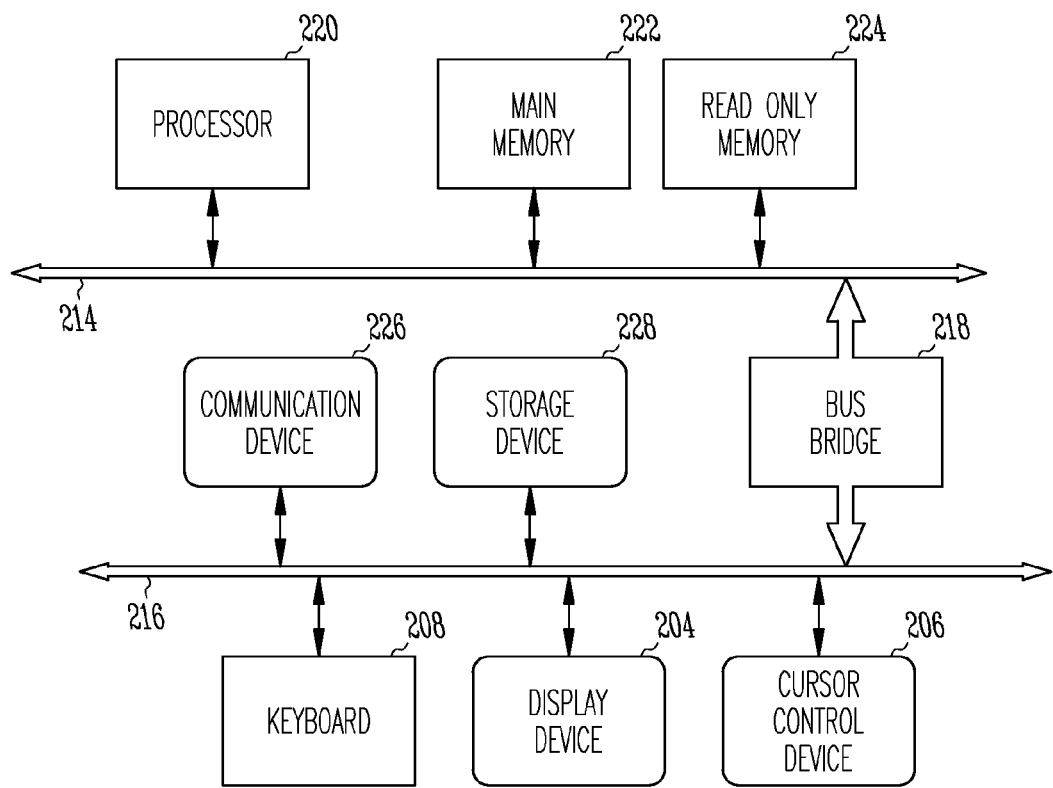

Having briefly described one embodiment of the network environment in which an example embodiment may operate, FIGS. 2a and 2b show an example of a computer system 200 illustrating an exemplary client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of an example embodiment includes software, information processing hardware, and various processing steps, which will be described below. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of user interface presentations may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented method and system for managing keyword bidding prices are disclosed. While the present invention has been described in terms of several example embodiments, those of ordinary skill in the art will recognize that the present invention is not limited to the embodiments described, but can be practiced with modification and alteration within the scope of the appended claims. The description herein is thus to be regarded as illustrative instead of limiting.

What is claimed is:

1. A computer-implemented method comprising:
   determining, by at least one processor, revenue parameters associated with a keyword;
   obtaining, by the at least one processor, automatic bid controls associated with the keyword and the revenue parameters;
   automatically generating, by at least one processor, a bid value for the keyword based on the bid controls and the revenue parameters, the automatic bid controls including a gap position target value, the gap position target value representing a position in a gap between a first next higher bid and a second next higher bid, the gap position target value corresponding to a specific monetary value between the first next higher bid and the second next higher bid; and
   transmitting the bid value to an online service via a data network communication.

2. The computer-implemented method of claim 1, wherein the online service comprises a search engine.

3. The computer-implemented method of claim 1, wherein the automatic bid controls comprise a maximum cost per click value that can be automatically bid for the keyword.

4. The computer-implemented method of claim 1, wherein the automatic bid controls comprise a bid increment factor.

5. The computer-implemented method of claim 1, wherein the automatic bid controls comprise a bid increment velocity factor.

6. The computer-implemented method of claim 1, wherein the automatic bid controls comprise a scaling factor for the revenue parameters.

7. The computer-implemented method of claim 6, further comprising applying the scaling factor to the revenue parameters to produce a scaled revenue parameter.

8. A system comprising:
   at least one processor; and
   a non-transitory computer-readable medium storing executable instructions that, when executed, cause the at least one processor to perform operations comprising:
   determining revenue parameters associated with a keyword;
   obtaining automatic bid controls associated with the keyword and the revenue parameters;
   automatically generating a bid value for the keyword based on the bid controls and the revenue parameters, the automatic bid controls including a gap position target value, the gap position target value representing a position in a gap between a first next higher bid and a second next higher bid, the gap position target value corresponding to a specific monetary value between the first next higher bid and the second next higher bid; and
   transmitting the bid value to an online service via a data network communication.

9. The system of claim 8, wherein the online service comprises a search engine.

10. The system of claim 8, wherein the automatic bid controls comprise a maximum cost per click value that can be automatically bid for the keyword.

11. The system of claim 8, wherein the automatic bid controls comprise a bid increment factor.

12. The system of claim 8, wherein the automatic bid controls comprise a bid increment velocity factor.

13. The system of claim 8, wherein the automatic bid controls comprise a scaling factor for the revenue parameters.

14. The system of claim 13, wherein the operations further comprise applying the scaling factor to the revenue parameters to produce a scaled revenue parameter.

15. A non-transitory computer-readable medium storing executable instructions that, when executed, cause at least one processor to perform operations comprising:
   determining revenue parameters associated with a keyword;
   obtaining automatic bid controls associated with the keyword and the revenue parameters;
   automatically generating a bid value for the keyword based on the bid controls and the revenue parameters, the automatic bid controls including a gap position target value, the gap position target value representing a position in a gap between a first next higher bid and a second next higher bid, the gap position target value corresponding to a specific monetary value between the first next higher bid and the second next higher bid; and
   transmitting the bid value to an online service via a data network communication.

16. The non-transitory computer-readable medium of claim 15, wherein the online service comprises a search engine.

17. The non-transitory computer-readable medium of claim 15, wherein the automatic bid controls comprise a maximum cost per click value that can be automatically bid for the keyword.

18. The non-transitory computer-readable medium of claim 15, wherein the automatic bid controls comprise a bid increment factor.

19. The non-transitory computer-readable medium of claim 15, wherein the automatic bid controls comprise a bid increment velocity factor.

20. The non-transitory computer-readable medium of claim 15, wherein the automatic bid controls comprise a scaling factor for the revenue parameters.

* * * * *